US012729059B2

(12) United States Patent
Fjeldheim et al.

(10) Patent No.: US 12,729,059 B2
(45) Date of Patent: Sep. 8, 2026

(54) LIFTING DEVICE ASSEMBLY FOR HANDLING A DELIVERY CONTAINER STORED WITHIN A STORAGE CONTAINER

(71) Applicant: Autostore Technology AS, Nedre Vats (NO)

(72) Inventors: Ivar Fjeldheim, Haugesund (NO); Ingvar Fagerland, Kolnes (NO); Trond Austrheim, Etne (NO)

(73) Assignee: AutoStore Technology AS, Nedre Vats (NO)

( * ) Notice: Subject to any disclaimer, the term of this patent is extended or adjusted under 35 U.S.C. 154(b) by 342 days.

(21) Appl. No.: 18/553,803

(22) PCT Filed: Apr. 7, 2022

(86) PCT No.: PCT/EP2022/059206

§ 371 (c)(1),
(2) Date: Oct. 3, 2023

(87) PCT Pub. No.: WO2022/214579

PCT Pub. Date: Oct. 13, 2022

(65) Prior Publication Data

US 2024/0217739 A1 Jul. 4, 2024

(30) Foreign Application Priority Data

Apr. 9, 2021 (NO) .................................... 20210436
Apr. 30, 2021 (NO) .................................... 20210523

(51) Int. Cl.
*B65G 1/04* (2006.01)

(52) U.S. Cl.
CPC .................................. *B65G 1/0464* (2013.01)

(58) Field of Classification Search
CPC .... B65G 1/0464; B65G 1/0478; B65G 1/065; B65G 47/904; B65G 2201/0235; B65G 1/0492; B25J 15/0047; B66C 1/663
See application file for complete search history.

(56) References Cited

U.S. PATENT DOCUMENTS

2008/0193270 A1 8/2008 Yoshida et al.
2014/0046486 A1 2/2014 Mimura et al.
(Continued)

FOREIGN PATENT DOCUMENTS

CN 106272497 A 1/2017
CN 110606365 A 12/2019
(Continued)

OTHER PUBLICATIONS

International Search Report issued in International Application No. PCT/EP2022/059206, mailed Jul. 18, 2022 (4 pages).
(Continued)

*Primary Examiner* — Justin Holmes
(74) *Attorney, Agent, or Firm* — Baker Botts L.L.P.

(57) ABSTRACT

A lifting device assembly for handling a delivery container stored within a storage container includes a delivery container coupler and a lifting device. The delivery container coupler includes a coupler frame having a coupler frame lower face and a coupler frame upper face, and a delivery container coupling mechanism fixed to the coupler frame and protruding from the coupler frame lower face for enabling releasable coupling to corresponding coupling structures within an inner volume of a delivery container. The lifting device includes a lifting frame having a lifting frame lower face and a lifting frame upper face, and a plurality of grippers connected to the lifting frame for releasable connection to the coupler. The lifting frame is configured such that the lifting frame lower face can be
(Continued)

arranged adjacent to the coupler frame upper face in a coupled position.

22 Claims, 12 Drawing Sheets

(56) References Cited

U.S. PATENT DOCUMENTS

| | | | | |
|---|---|---|---|---|
| 2017/0129702 | A1* | 5/2017 | Hognaland | B65G 1/0464 |
| 2018/0370725 | A1 | 12/2018 | Hognaland et al. | |
| 2019/0031399 | A1 | 1/2019 | Shaikh et al. | |
| 2019/0047787 | A1 | 2/2019 | Fosnight et al. | |
| 2020/0148471 | A1 | 5/2020 | Lindbo et al. | |
| 2020/0223629 | A1 | 7/2020 | Lindbo et al. | |
| 2021/0016966 | A1 | 1/2021 | Heggebo et al. | |
| 2021/0221618 | A1 | 7/2021 | Austrheim | |

FOREIGN PATENT DOCUMENTS

| | | | | | |
|---|---|---|---|---|---|
| CN | 112041244 | A | * | 12/2020 | B66C 13/08 |
| CN | 112262089 | A | | 1/2021 | |
| EP | 0949182 | A2 | * | 10/1999 | B66C 1/66 |
| EP | 2953135 | A2 | | 12/2015 | |
| EP | 2962962 | A1 | | 1/2016 | |
| JP | 2001039509 | A | | 2/2001 | |
| JP | 3760544 | B2 | * | 3/2006 | |
| JP | 2013045964 | A | | 3/2013 | |
| JP | 2019508341 | A | | 3/2019 | |
| JP | 2020530406 | A | | 10/2020 | |
| NO | 317366 | B1 | | 10/2004 | |
| WO | 2014090684 | A1 | | 6/2014 | |
| WO | 2015193278 | A1 | | 12/2015 | |
| WO | 2017211634 | A1 | | 12/2017 | |
| WO | 2018146304 | A1 | | 8/2018 | |
| WO | 2019206482 | A1 | | 10/2019 | |
| WO | 2019206487 | A1 | | 10/2019 | |
| WO | 2021032888 | A1 | | 2/2021 | |

OTHER PUBLICATIONS

Written Opinion issued in International Application No. PCT/EP2022/059206; Dated Jul. 18, 2022 (8 pages).

Search Report issued in Norwegian Application No. 20210523; Dated Jan. 7, 2022 (2 pages).

Li, Li, Office Action in CN202280027223.X, mailed Jun. 21, 2025, 19 pages, The State Intellectual Property Office of the People's Republic of China, Beijing, China.

Coquau, Stephane, Office Action in EP22721069.7, mailed Nov. 10, 2025, 5 pages, European Patent Office, Munich, Germany.

Anh, Le Huy, Office Action in Vietnam patent application 1202307898, mailed Nov. 20, 2025, 4 pages, Intellectual Property Office of Vietnam, Hanoi, Vietnam.

Coquau, Stéphane, International Preliminary Report on Patentability in PCT international patent application PCT/EP2022/059206, mailed Oct. 10, 2023, 9 pages, European Patent Office, Rijswijk, Netherlands.

Tanaka, Tomoya, Office Action in JP2023561165, mailed Feb. 26, 2026, 6 pages, Japan Patent Office, Tokyo, Japan.

* cited by examiner

LIFTING DEVICE ASSEMBLY FOR HANDLING A DELIVERY CONTAINER STORED WITHIN A STORAGE CONTAINER

FIELD OF THE INVENTION

The present invention relates a coupler for releasable coupling to a container, an assembly comprising such a coupler and a storage system. The present invention also relates to a method for handling containers using the assembly.

BACKGROUND AND PRIOR ART

FIG. 1 discloses an automated storage and retrieval system 100 with a framework/storage grid 101 supported on a floor/platform 700 and FIGS. 2, 3 and 4 disclose three different prior art container handling vehicles 200,300,350 suitable for operating on such a storage grid 101.

The framework 101 comprises upright members 102 and a storage volume comprising storage columns 105 arranged in rows between the upright members 102. In these storage columns 105 storage containers 106, also known as bins, are stacked one on top of one another to form stacks 107. The members 102 may typically be made of metal, e.g. extruded aluminum profiles.

The framework 101 of the automated storage and retrieval system 100 comprises a rail system 108 arranged across the top of the framework 101, on which rail system 108 a plurality of container handling vehicles 200,300,350 may be operated to raise storage containers 106 from, and lower storage containers 106 into, the storage columns 105, and also to transport the storage containers 106 above the storage columns 105. The rail system 108 comprises a first set of parallel rails 110 arranged to guide movement of the container handling vehicles 200,300,350 in a first direction X across the top of the framework 101, and a second set of parallel rails 111 arranged perpendicular to the first set of rails 110 to guide movement of the container handling vehicles 200,300,350 in a second direction Y which is perpendicular to the first direction X. Containers 106 stored in the storage columns 105 are accessed by the container handling vehicles 200,300,350 through access openings 112 in the rail system 108. The container handling vehicles 200,300,350 can move laterally above the storage columns 105, i.e. in a plane which is parallel to the horizontal X-Y plane.

The upright members 102 of the framework 101 may be used to guide the storage containers 106 during raising of the containers out from, and lowering of the containers into, the columns 105. The stacks 107 of containers 106 are typically self-supportive.

Referring to FIGS. 2-4, each prior art container handling vehicle 200,300,350 comprises a vehicle body 201,301,351 and first and second sets of wheels 202*a*, 202*b*, 302*a*, 302*b*, 352*a*, 352*b* which enable the lateral movement of the container handling vehicles 200,300,350 in the X direction and in the Y direction, respectively. In FIGS. 2 and 3 two wheels in each set of four wheels are visible, while in FIG. 4, three wheels in each set of four wheels are visible. The first set of wheels 202*a*, 302*a*,352*a* is arranged to engage with two adjacent rails of the first set 110 of rails, and the second set of wheels 202*b*,302*b*,352*b* is arranged to engage with two adjacent rails of the second set 111 of rails. At least one of the sets of wheels 202*a*, 302*a*, 352*a*, 202*b*, 302*b*, 352*b* can be lifted and lowered, so that the first set of wheels 202*a*,302*a*,352*a* and/or the second set of wheels 2026,302*b*, 352*b* can be engaged with the respective set of rails 110, 111 at any one time.

Each prior art container handling vehicle 200,300,350 also comprises a lifting device 210,360 for vertical transportation of storage containers 106, e.g. raising a storage container 106 from, and lowering a storage container 106 into, a storage column 105. The lifting device 210,360 comprises one or more gripper elements 362 which are adapted to engage a storage container 106, and which gripping elements 362 can be lowered from the vehicle 200,300,350 so that the position of the gripping elements 362 with respect to the vehicle body 201,301,351 can be adjusted in a third direction Z orthogonal to the first direction X and the second direction Y. The lifting device 210,360 of the container handling vehicles 200,350 are shown in FIG. 2 and FIG. 4. The lifting device of the container handling vehicle 300 shown in FIG. 3 is located within the vehicle body 301.

Conventionally, and also for the purpose of this application, Z=1 identifies the uppermost layer of storage containers, i.e. the layer immediately below the rail system 108, Z=2 the second layer below the rail system 108, Z=3 the third layer etc. In the exemplary prior art disclosed in FIG. 1, Z=8 identifies the lowermost, bottom layer of storage containers. Similarly, X=1 . . . n and Y=1 . . . n identifies the position of each storage column 105 in the horizontal plane. Consequently, as an example, and using the Cartesian coordinate system X, Y, Z indicated in FIG. 1, the storage container identified as 106' in FIG. 1 can be said to occupy storage position X=19, Y=1 and Z=3. The container handling vehicles 200,300 can be said to travel in layer Z=0, and each storage column 105 can be identified by its X and Y coordinates.

The possible storage positions within the framework/storage grid 101 are referred to as storage cells. Each storage column 105 may be identified by a position in an X- and Y-direction, while each storage cell may be identified by a container number in the X-, Y and Z-direction.

Each prior art container handling vehicle 200,300,350 comprises a storage compartment or space for receiving and stowing a storage container 106 when transporting the storage container 106 across the rail system 108.

The storage space may be below a cantilever construction of a container handling vehicle 200 as shown in FIG. 2. Such a vehicle is described in detail in e.g. NO317366, the contents of which are also incorporated herein by reference.

In another configuration, the storage space may comprise a cavity arranged internally within the vehicle body 301,351 as shown in FIGS. 3 and 4 and as described in e.g. WO2015/193278A1 and WO2019/206487A1, the contents of which are incorporated herein by reference.

The container handling vehicles 300 shown in FIG. 3 may have a centrally arranged cavity and a footprint that covers an area with dimensions in the X and Y directions which is generally equal to the lateral extent of a storage column 105, e.g. as described in WO2015/193278A1, the contents of which are incorporated herein by reference.

Alternatively, the cavity container handling vehicles 350 may have a footprint which is larger than the lateral area defined by a storage column 105 as shown in FIGS. 1 and 4, and as is disclosed in e.g. WO2014/090684A1, EP2962962 or WO2019/206487A1.

Note that the term 'lateral' used herein may mean 'horizontal'.

FIG. 1 shows container handling vehicles with a plurality of cantilever vehicles 200 (FIG. 3) and a plurality of cavity vehicles 350 (FIG. 4) which extend beyond the footprint of a single storage column 105.

The rail system 108 typically comprises rails 110,111 with grooves in which the wheels of the vehicles run. Alternatively, the rails 110,111 may comprise upwardly protruding elements, where the wheels of the vehicles comprise flanges to prevent derailing. These grooves and upwardly protruding elements are collectively known as tracks. Each rail 110,111 may comprise one track, or each rail 110,111 may comprise two parallel tracks. Each rail 110,111 may also comprise two track members that are fastened together, each track member providing one of a pair of tracks provided by each rail.

WO2018/146304, the contents of which are incorporated herein by reference, illustrates a typical configuration of rail system 108 comprising rails and parallel tracks in both X and Y directions.

In the framework 100, a majority of the columns 105 are storage columns 105, i.e. columns 105 where storage containers 106 are stored in stacks 107. However, some columns 105 may have other purposes. In FIG. 1, columns 119 and 120 are such special-purpose columns used by the container handling vehicles 200,300,350 to drop off and/or pick up storage containers 106 so that they can be transported to an access station (not shown) where the storage containers 106 can be accessed from outside of the framework 100 or transferred out of or into the framework 100. Within the art, such a location is normally referred to as a 'port' and the column in which the port is located may be referred to as a 'port column' 119,120. The transportation to the access station may be in any direction, that is horizontal, tilted and/or vertical. For example, the storage containers 106 may be placed in a random or dedicated column 105 within the framework structure 100, then picked up by any container handling vehicle and transported to a port column 119,120 for further transportation to an access station. Note that the term 'tilted' means transportation of storage containers 106 having a general transportation orientation somewhere between horizontal and vertical.

In FIG. 1, the first port column 119 may for example be a drop-off port column where the container handling vehicles 200,300,350 can drop off storage containers 106 to be transported to an access and distribution station 500, and the second port column 120 may be a dedicated pick-up port column where the container handling vehicles 200,300,350 can pick up storage containers 106 that have been transported from the access and distribution station.

The access and distribution station may typically be a picking or a stocking station where product items are removed from or positioned into the storage containers 106. In a picking or a stocking station, the storage containers 106 are normally not removed from the automated storage and retrieval system 100, but are returned into the framework 100 again once accessed. A port can also be used for transferring storage containers to another storage facility (e.g. to another framework or to another automated storage and retrieval system), to a transport vehicle (e.g. a train or a lorry), or to a production facility.

When a target storage container 106' stored in one of the columns 105 disclosed in FIG. 1 is to be accessed, one of the container handling vehicles 200,300,350 is instructed to retrieve the target storage container 106' from its position and transport it to the drop-off port column 119. This operation involves moving the container handling vehicle 200,300,350 to a location above the storage column 105 in which the target storage container 106' is positioned, retrieving the storage container 106 from the storage column 105 using the container handling vehicle's 200,300,350 lifting device 210,360, and transporting the storage container 106 to the drop-off port column 119. If the target storage container 106' is located deep within a stack 107, i.e. with one or a plurality of other storage containers 106 positioned above the target storage container 106', the operation also involves temporarily moving the above-positioned storage containers 106 prior to lifting the target storage container 106' from the storage column 105. This step, which is sometimes referred to as "digging" within the art, may be performed with the same container handling vehicle that is subsequently used for transporting the target storage container to the drop-off port column 119, or with one or a plurality of other cooperating container handling vehicles. Alternatively, or in addition, the automated storage and retrieval system 100 may have container handling vehicles specifically dedicated to the task of temporarily removing storage containers from a storage column 105. Once the target storage container 106' has been removed from the storage column 105, the temporarily removed storage containers 106 can be repositioned into the original storage column 105. However, the removed storage containers 106 may alternatively be relocated to other storage columns 105.

When a storage container 106' is to be stored in one of the columns 105, one of the container handling vehicles 200, 300,350 is instructed to pick up the storage container 106' from the pick-up port column 120 and transport it to a location above the storage column 105 where it is to be stored. After any storage containers 106 positioned at or above the target position within the storage column stack 107 have been removed, the container handling vehicle 200,300,350 positions the target storage container 106' at the desired position. The removed storage containers 106 may then be lowered back into the storage column 105, or relocated to other storage columns.

For monitoring and controlling the automated storage and retrieval system 100, e.g. monitoring and controlling the location of respective storage containers 106 within the framework 101, the content of each storage container 106, and the movement of the container handling vehicles 200, 300,350 so that a desired storage container 106' can be delivered to the desired location at the desired time without the container handling vehicles 200,300,350 colliding with each other, the automated storage and retrieval system 100 comprises a control system 600 which typically is computerized and which typically comprises a database for keeping track of the storage containers 106.

To facilitate the storage and retrieval of inventory and/or other items stored with the storage containers 106, the items may be picked from the storage containers and placed into delivery containers adapted for handling by systems outside the above described framework 101.

In particular for large storage systems, the number of storage container retrievals per hour may be tens of thousands, corresponding to typically hundreds or thousands of customer orders, and each of these customer orders may include several different items. In order to allow efficient handling and delivery of the different items in each customer order, while at the same time avoiding installation of an excessive number of expensive conveyor belts and automated handling systems, the items should be continuously consolidated into delivery containers and set aside until the moment of dispatchment.

One problem with current consolidation systems is the need of large external areas for storing consolidated delivery containers. The availability of such temporary storage is however often low since it is of importance for operational and economical reasonings that the space taken up by the storage system should be as large as possible.

An objective of the present invention is therefore to allow effective consolidation of items from storage containers into delivery containers with little or no need of using areas surrounding the framework/storage grid 101 to store these consolidated delivery containers prior to shipments.

SUMMARY OF THE INVENTION

The invention is set forth in the independent claims and the dependent claims describe certain optional features of the invention.

In a first aspect, the invention concerns a lifting device assembly for handling a delivery container stored within a storage container.

The lifting device assembly comprises a delivery container coupler comprising a coupler frame having a coupler frame lower face and a coupler frame upper face and a delivery container coupling mechanism fixed to the coupler frame and protruding from the coupler frame lower face for enabling releasable coupling to corresponding coupling structures within an inner volume of a delivery container.

The coupling structure may form part of the inner surface of the delivery container such as recesses/holes. The coupling structure may alternatively, or in addition, constitutes specific structure(s) having a profile configured to engage with the delivery container coupling mechanism such as wedges/plates protruding inwards from the inner surface. A delivery container coupling mechanism configured to grip a contour of the delivery container may also be envisaged.

The lifting device assembly further includes a lifting device comprising a lifting frame having a lifting frame lower face and a lifting frame upper face, a plurality of grippers connected to the lifting frame for releasable connection to at least the coupler, preferably to the coupler frame, and optionally attachment points/mounts/elements for attachment of lifting bands to the lifting frame.

The lifting frame is configured such that the lifting frame lower face can be arranged adjacent to the coupler frame upper face in one or more coupled positions.

Note that lifting bands may be any device that ensures that the lifting frame is suspended from vehicles/cranes, and which allow its/their lower ends to be raised/lowered by a lifting motor constituting part of the vehicle/crane.

Since the delivery container may be stored within the storage container, the maximum horizontal cross-sectional area of the outer contour of the delivery container should be less than the minimum horizontal cross-sectional area of the inner contour of the storage container. Moreover, the vertical height of the delivery container should be equal or less than the vertical height of the storage container.

The structures of the lifting device and coupler are hence configured so that they can be guided to nest together as the lifting device grips and takes control of the coupler.

In an advantageous configuration of the first aspect of the invention, the coupler frame further comprises a plurality of recesses and/or throughgoing holes, wherein the number of recesses and/or throughgoing holes is at least equal to the number of grippers of the lifting device. Furthermore, the position of each recess and/or throughgoing hole may be such that, when the lifting frame lower face is arranged in the coupling position above the coupler frame upper face, each gripper is aligned with a corresponding recess and/or throughgoing hole. The predetermined coupling position is preferably at a horizontal position above the coupler, where the vertical centre axis of the lifting frame lower face is aligned with the vertical centre axis of the coupler frame upper face.

Note that a gripper is defined as any mechanism capable of establishing a releasable coupling to the corresponding recess/throughgoing hole. A gripper may, for example, be a remotely operable claw designed to enter the recess/throughgoing hole in a closed state and abutting the vertical walls of the recess/throughgoing hole in an open state.

In another advantageous configuration, the lifting device further comprises a sensor configured to sense when the lifting frame lower face is in contact with, and/or in proximity to, the coupler frame upper face.

The lifting device may further comprise a robot sensor configured to sense when the lifting frame upper face is in proximity to a vehicle/crane during operation.

The sensor and/or the robot sensor preferably comprises a transmitter allowing transmittal of sensed signals to a remote control system. Furthermore, the sensor(s)/robot sensor(s) may be in form of a capacitive sensor (mutual capacitance and/or self-capacitance) for registering direct contact or proximity with the coupler frame or vehicle/crane.

For example, the lifting device may comprise four sensors arranged at or near the four edges of the lower lifting frame face.

Similarly, the lifting device may comprise four robot sensors arranged at or near the four corners of the lifting frame upper face.

In yet another advantageous configuration, the plurality of grippers, such as claws and/or hooks, protrudes from the lifting frame lower face and wherein the lifting device further comprises a gripper operating mechanism arranged at least partly within the lifting frame. The gripper operating mechanism is in this preferred example configured to operate at least one of the plurality of grippers.

In yet another advantageous configuration, the lifting device further comprises a plurality of guiding pins, preferably arranged at the corners of the lifting frame, which protrude from the lifting frame lower face for insertion into receiving recesses of a storage container. The guiding pins are preferably arranged at the corners of the lifting frame. Furthermore, the storage container is arranged to store the delivery container there within. In this example configuration, the coupler frame further comprises a plurality of guiding pin receiving recesses and/or throughgoing holes extending between the coupler frame lower and upper faces, and oriented perpendicular to the coupler frame faces. The position of each guiding pin receiving recess and/or throughgoing hole is such that, when the lifting frame lower face is arranged in the coupled position above the coupler frame upper face, each guiding pin passes through a corresponding guiding pin receiving recess and/or throughgoing hole.

In yet another advantageous configuration, a horizontal cross-sectional area of the lifting frame lower face is at least equal to a horizontal cross sectional area of the coupler frame upper face.

In yet another advantageous configuration, the delivery container coupling mechanism comprises at least two gripper paddles/plates for gripping the delivery container arranged at equal and oppositely directed distances from a vertical centre plane (CP) oriented perpendicular to the coupler frame lower face and intercepting a centre point of the face.

Each of the gripper paddles comprises in this example configuration a protrusion located below the coupler frame lower face for insertion into a corresponding coupling structure/formation of the delivery container. The coupling structure/formation may be recesses/apertures/throughgoing holes within the inner volume of the delivery container, and/or an internal ledge at the contour of the delivery container under which the protrusion may be arranged.

The opposite configuration may also be feasible, i.e. a recess at each gripper paddle and a corresponding protrusion such as a wedge or a tab from the inner wall of the delivery container.

Each of the gripper paddles may further comprise an upper end pivotably or resiliently connected to the coupler frame.

The gripper paddles are arranged internally of the grippers of the lifting device since the paddles are intended to pick up the smaller delivery container within the larger storage container. When in a coupled position, the grippers of the lifting device are arranged around a perimeter area/opening frame of the storage container, and the gripper paddles of the coupler are hinged to the coupler frame inwardly of the grippers.

In yet another advantageous configuration, the delivery container coupling mechanism may further comprise a displacement system for displacing the two gripper paddles in opposite directions from the vertical centre plane ('P until the protrusions have engaged the respective coupling structure/formation of the delivery container. The displacement system is preferably also configured such that the protrusions may disconnect to release the delivery containers.

The displacement system may further comprise a motor, preferably arranged at or near the centre plane ('P, a control system configured to control operation of the motor, a first link such as a first arm connected at least indirectly at one end to the motor and the other end to one of the two gripper paddles and a second link such as a second arm connected at least indirectly at one end to the motor and the other end to the other of the two gripper paddles. The motor may be configured to displace the first and second links in opposite directions away from the vertical centre plane (P. For example, the motor may swivel pivots connecting the first and second links to a rotary element of the motor.

Moreover, the displacement system may comprise a rotary element such as a disc connecting the first and second links to a shaft of the motor, wherein the motor, the rotary element and the links are configured such that the opposite directed displacement of the first and second links is achieved by rotating the rotary element clockwise or counterclockwise between 0 degrees and 180 degrees, for example 90 degrees (optionally ±30 degrees). The ends of the links are connected to the motor such that the first and second links/arms are parallel to each other when in extended position.

The control system may be divided into a lower part at the coupler frame lower face and an upper part at the coupler frame upper face. The upper part may comprise one or more lifting device connectors/electrical contacts in signal communication with the lower part. Further, the lifting frame may comprise one or more coupler connectors/electrical contacts in signal communication with the one or more lifting device connectors. With this particular configuration of the control system, the gripper paddles may be controlled remotely via the lifting device when connected.

In a second aspect, the invention concerns a delivery container coupler for use in a lifting device assembly according to the description above.

The coupler comprises a coupler frame having a coupler frame lower face and a coupler frame upper face and a delivery container coupling mechanism fixed to the coupler frame and protruding from the coupler frame lower face for enabling releasable coupling to corresponding coupling structures/formations within an inner volume of a delivery container, for example within or at the inner walls. The coupler is in this second aspect configured to be gripped from the coupler frame upper face by a plurality of grippers of a lifting device.

The coupler may further comprise connectors/electrical contacts on its coupler frame upper face to receive electrical power and optionally signals from the lifting device when in a coupled position beneath the lifting device and gripped by the grippers of the lifting device. The electrical power and signals are for operating gripper members/paddles of the delivery container coupling mechanism to grip a formation at an interior surface of a delivery container and/or a ledge at the contour of the delivery container. Signal communication may alternatively be transmitted wireless between a receiver at or within the coupler and one or more remote control systems. Further remote control system(s) may be within the container handling vehicle and/or a central control system for the storage system.

The coupler should also be configured to allow a switching over of the control signals once the coupler has been picked up so that the gripper paddles are commanded by the vehicle's signals to pivot in and out in order to grip the delivery container. When the coupler is attached, the grippers of the lifting device remain in a static gripping position.

In an advantageous configuration of the second aspect of the invention, the delivery container coupling mechanism comprises gripper paddles arranged to be pivoted or resiliently displaced outwardly into contact with coupling structures/formations of the delivery container.

In another advantageous configuration the coupler is configured to extend no further in a transverse/horizontal direction than a perimeter of the lifting device it is intended to be coupled with.

All other configurations of the coupler described in connection with the first aspect also apply for the second aspect.

In a third aspect, the invention concerns a container handling vehicle comprising drive means configured to travel along a base such as a rail system, a lifting device assembly in accordance with the above description, a storage container space for receiving and stowing a storage container, a lifting motor for lifting the storage container into the storage container space and lifting bands connected at one end to the attachment points/mounts of the lifting device and the other end to the lifting motor.

Alternatively, the container handling vehicle may be a crane suspended from a rail system.

In a fourth aspect, the invention concerns a storage and retrieval system comprising a framework and a rail system. The framework comprises a plurality of vertical upright members defining a plurality of storage columns for storing stacks of storage containers. The rail system is arranged on top of the framework and comprises perpendicular rails, the intersections of which rails form a grid of grid cells. The rails define grid openings into the plurality of storage columns.

The storage and retrieval system further includes a container handling vehicle comprising drive means such as motorized wheels configured to travel along the rail system, a lifting device assembly in accordance with the description above, a storage container space for receiving and stowing a storage container, a lifting motor for lifting the storage container into the storage container space and lifting bands connected at one end to the attachment points/mounts and the other end to the lifting motor. The lifting motor may be arranged at least party above the container space or at the side of the container space. The latter arrangement would typically be the case for cantilever vehicles (see above). A vehicle configuration where a lifting motor is arranged closer to the rail system may also be envisaged.

In an advantageous configuration of the fourth aspect of the invention, the storage and retrieval system further comprises a control system and a robotic picking device in signal communication with the control system. The robotic picking device comprises a robotic base, a first robotic segment/arm rotatably connected to the robotic base and an operative end configured to allow releasable connection to the delivery container. The robotic picking device is configured such that the operative end may be moved to a position at least within reach of the storage container to be delivered to an access and distribution station.

The robotic picking device is preferably arranged outside, and adjacent to, the storage and retrieval system.

In a fifth aspect, the invention concerns a method for lifting a delivery container out of a storage container when the delivery container is arranged within the inner volume of the storage container by use of a delivery container coupler.

The lifting is performed by a container handling vehicle comprising a storage container space for receiving and stowing a storage container, drive means configured to move the vehicle along a base, a lifting device for lifting and lowering the storage container, a lifting motor for lifting the storage container into the storage container space and lifting bands connected at one end to attachment points/mounts of the lifting device and the other end to the lifting motor. The lifting motor may be arranged at least partly above the storage container space or at the side of the storage container space.

The lifting device comprises a lifting frame having a lifting frame lower face and a lifting frame upper face and a plurality of grippers protruding from the lifting frame lower face.

Further, the coupler comprises a coupler frame having a coupler frame lower face and a coupler frame upper face and a delivery container coupling mechanism fixed to the coupler frame and protruding from the coupler frame lower face for enabling releasable coupling to corresponding coupling structures/formations within an inner volume of a delivery container, for example at the inner wall of the delivery container and/or at the contour of the delivery container.

The method comprises the following steps:

- lowering the lifting device such that the lifting frame lower face is brought into contact or proximity with the coupler frame upper face,
- gripping the coupler by operating the grippers of the lifting device to form a lifting device assembly,
- raising the lifting device with the coupler connected thereto,
- moving the container handling vehicle to a position in which the lifting device assembly is above a storage container containing a delivery container,
- lowering the lifting device assembly to a position in which the coupler may connect with the delivery container,
- connecting the coupler to the delivery container and
- raising the delivery container from within the storage container by use of the lifting motor (thereby separating the delivery container from the storage container) until the delivery container is at least partly within the storage container space.

In an advantageous example of the fifth aspect of the invention, the storage container containing the delivery container to be lifted is stored in a storage and retrieval system including, in addition to the above mentioned container handling vehicle, a framework comprising a plurality of vertical upright members and a rail system arranged on top of the framework, corresponding to the above mentioned base. The upright members define a plurality of storage columns for storing stacks of storage containers. The rail system comprises perpendicular rails, the intersections of which rails form a grid of grid cells. The rails thus define grid openings into the plurality of storage columns. The movements of the vehicle are thus restricted to the directions of the rails in the rail system.

In this particular configuration, the delivery container coupler may initially be supported on the rail system.

In another advantageous example of the fifth aspect, the storage and retrieval system further comprises a port column set up by the vertical upright members and an access and distribution station arranged at a lower end of the port column.

In this particular configuration, the method further comprises the steps of

- moving the container handling vehicle to a position where the delivery container is directly above the port column and
- transporting the delivery container to the access and distribution station, for example by use of the lifting device of the vehicle.

Alternatively, the delivery container may be transported to the access and distribution station by use of conveyor belt(s).

In yet another advantageous example, the method further comprises the steps of

- if necessary, re-connecting the container handling vehicle to the coupler,
- moving the container handling vehicle to a position such that the coupler is directly above the port column,
- lowering the coupler into the port column until the coupler is in a gripping position with a delivery container situated at a lower end of the port column,
- connecting the delivery container to the coupler and
- raising the delivery container at least partly into the storage container space of the container handling vehicle.

Alternatively, the vehicle is moved to a location at the end of the conveyor belt transporting the delivery containers from the access and distribution station.

In a sixth aspect, the invention concerns a computer-readable medium having stored thereon a computer program comprising instructions to execute the method steps described above.

BRIEF DESCRIPTION OF THE DRAWINGS

The following drawings depict alternatives of the present invention and are appended to facilitate the understanding of the invention. However, the features disclosed in the drawings are for illustrative purposes only and shall not be interpreted in a limiting sense.

DETAILED DESCRIPTION OF THE INVENTION

Figure 1:
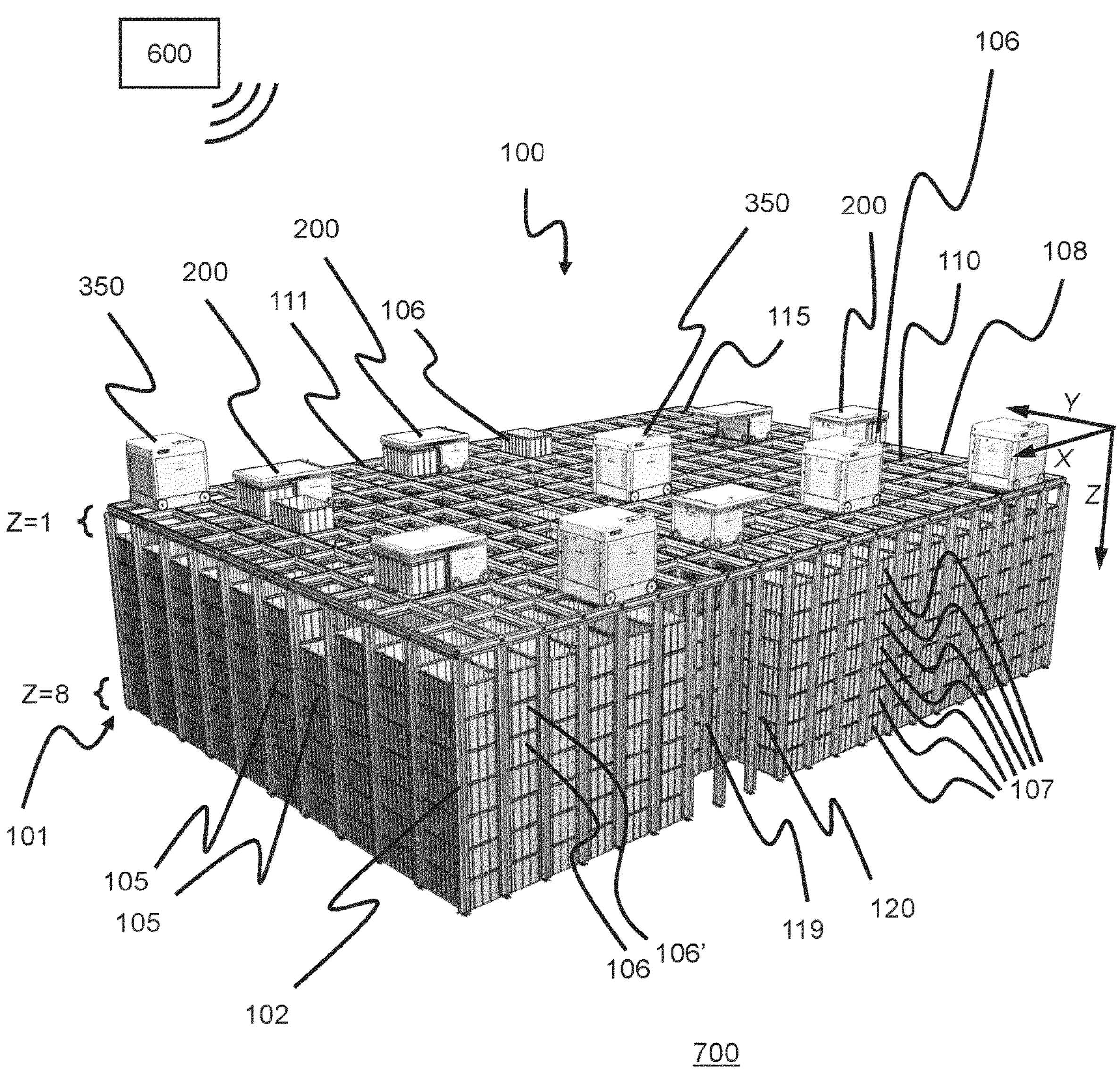
FIG. 1 is a perspective view of a prior art automated storage and retrieval system.
Figure 2:
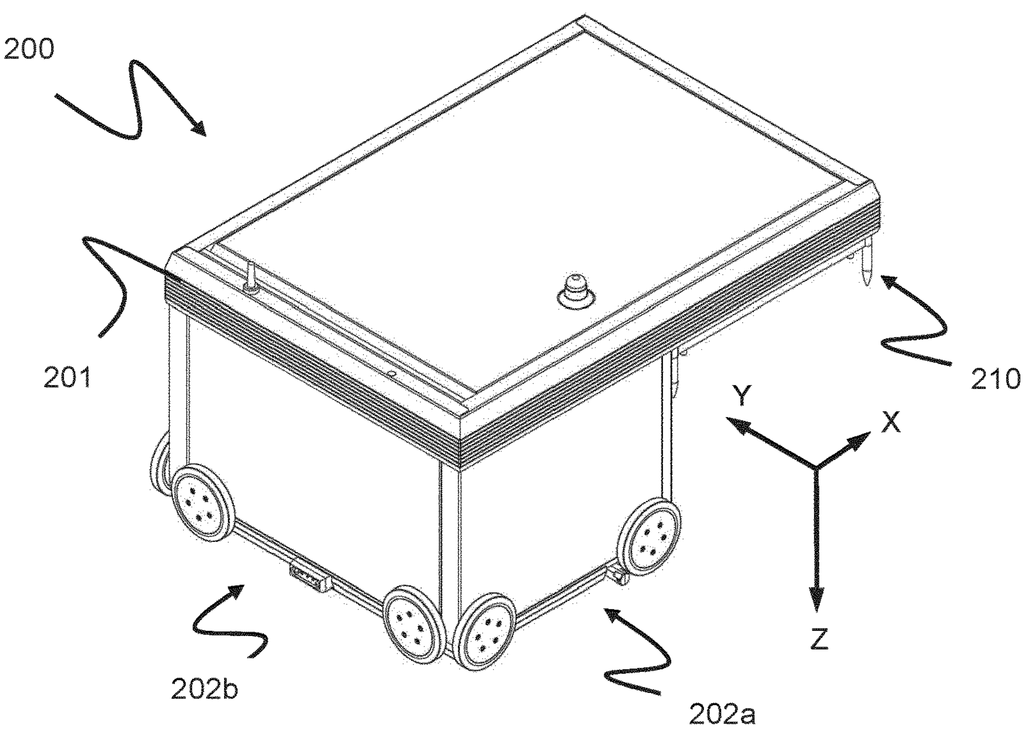
FIG. 2 is a perspective view of a prior art container handling vehicle having a cantilever for carrying storage containers underneath.
Figure 3:
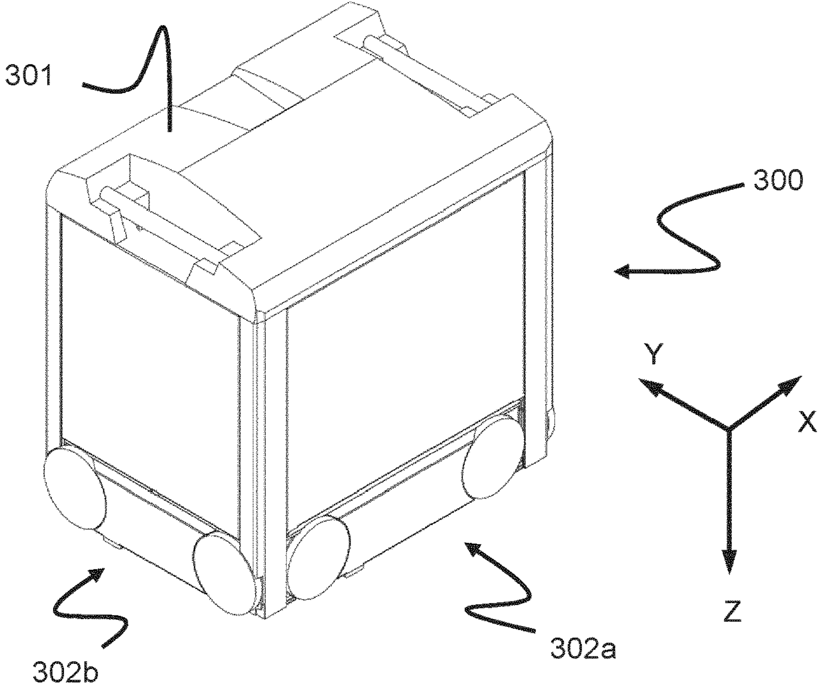
FIG. 3 is a perspective view of a prior art container handling vehicle having a centrally arranged cavity for carrying storage containers therein.
Figure 4:
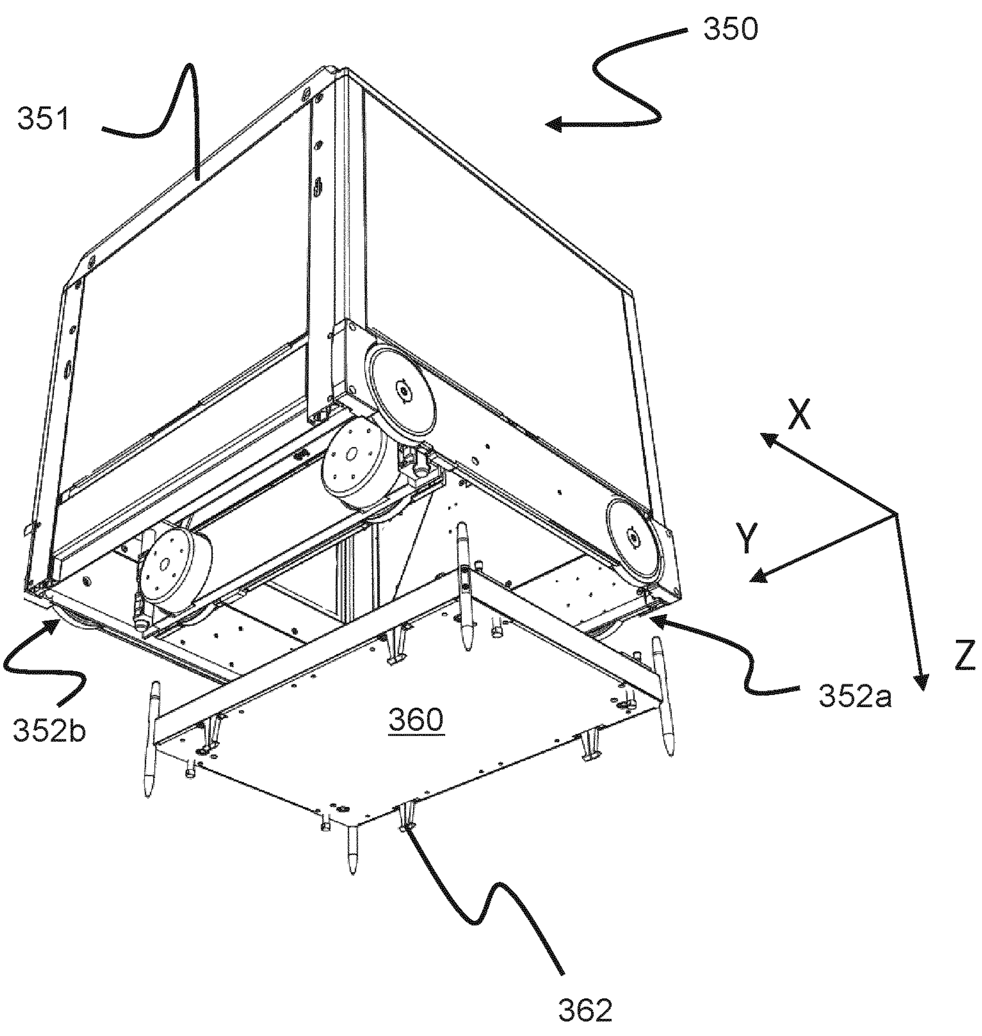
FIG. 4 is a perspective view of a prior art container handling vehicle having an internally arranged cavity for carrying storage containers therein, wherein the cavity is offset from center relative to the X-direction.

In the following, different embodiments will be discussed in more detail with reference to the appended drawings. It should be understood, however, that the drawings are not intended to limit the scope of the invention to the subject-matter depicted in the drawings. Furthermore, even if some of the features are described in relation to the system only, it is apparent that they are valid for the methods as well, and vice versa.

Figure 5:
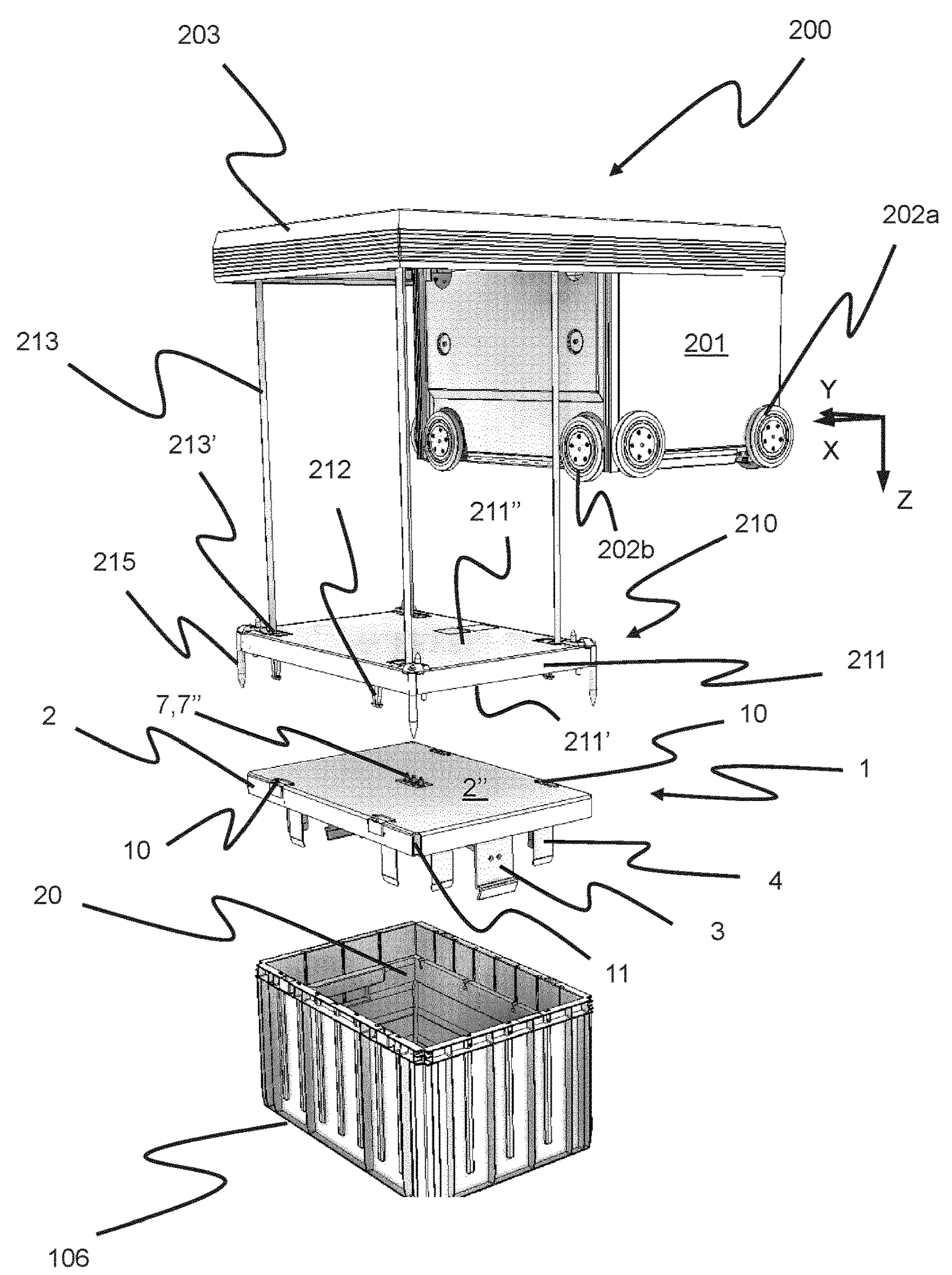
FIG. 5 is a perspective side view of the prior art container handling vehicle in FIG. 2, wherein its lifting device is in alignment above a coupler frame of a delivery container coupler for releasable connection to a delivery container stored within a storage container.
Figure 6:
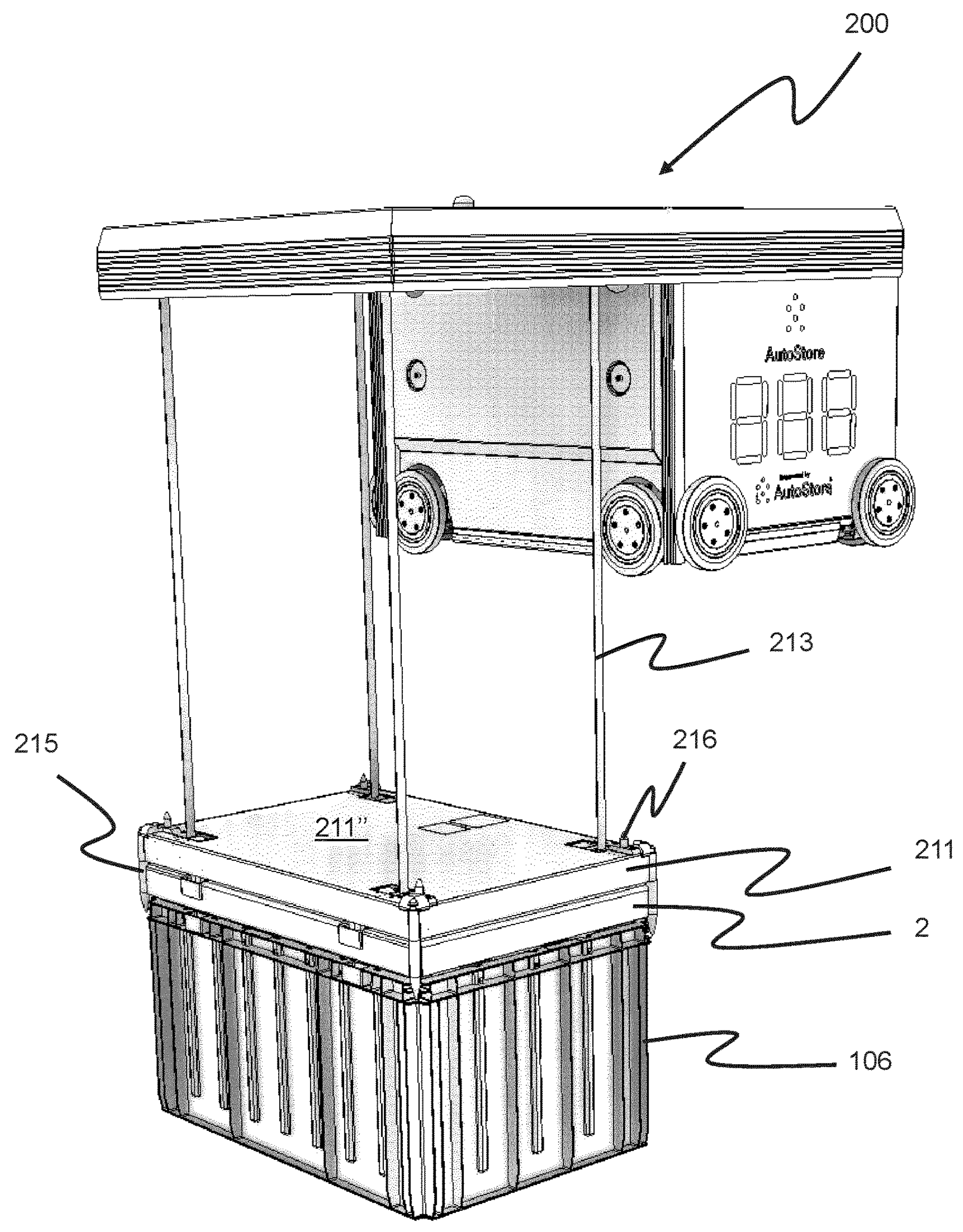
FIG. 6 is a perspective side view of the prior art container handling vehicle in FIG. 2, wherein its lifting device has been coupled to the coupler frame, and the resulting assembly is positioned in contact with a storage container containing a delivery container.

FIG. 5 shows in perspective a cantilever type container handling vehicle 200 comprising a vehicle body 201, a first set of wheels 202*a* for movements in X direction, a second set of wheels 202*b* for movements in Y direction, a cantilever 203 extending from the upper part of the vehicle body 201 and a lifting device 210 suspended below the cantilever 203 configured to releasably grab and lift both a storage container 106 and a coupler 1 as further described below.

The lifting device 210 includes a lifting frame 211 having a lower face 211' and a upper face 211" oriented in the X, Y-plane, grippers 212 such as claws or hooks protruding from the lower face 211', lifting bands 213 attached at their lower ends to attachment points 213' at the upper face 211" at their upper ends to lifting mechanism (not shown) at least partly arranged within the cantilever 203 and guiding pins 215 oriented in the Z direction and attached to the four lateral corners of the lifting frame 211.

A coupler 1 configured to releasably connect to a delivery container 20 is shown below the lifting device 210, wherein the size of the delivery container 20 is such that the it may fit into the storage container 106. As seen in FIG. 5, also the height of the delivery container 20 may be lower than the height of the storage container 106.

Hereinafter, the storage container 106 and the delivery container 20 will be referred to as bin and tote, respectively.

Figure 7:
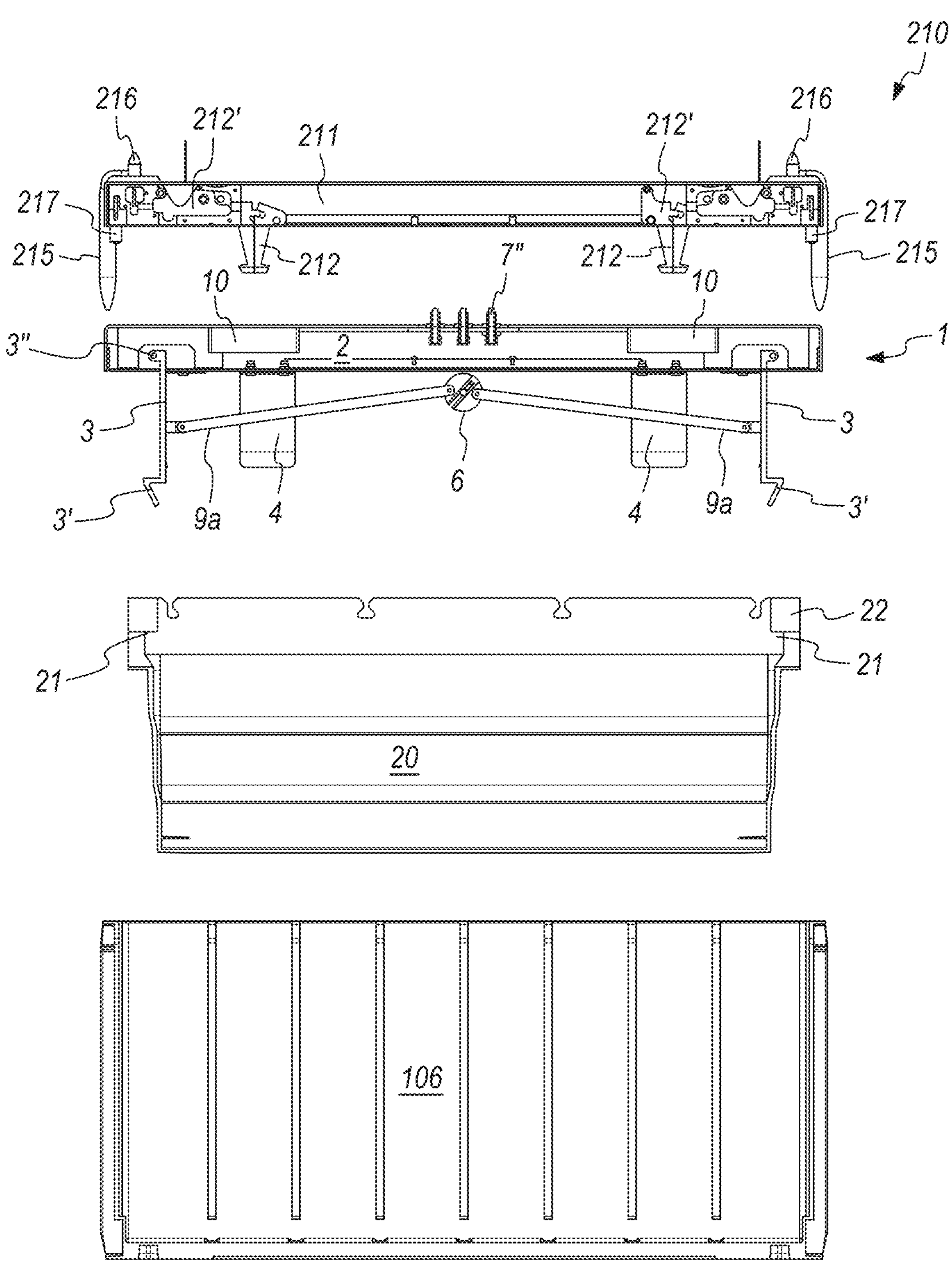
FIG. 7 are cross sectional views of, from top to bottom, a lifting frame of a lifting device, a coupler frame of a delivery container coupler, a delivery container and a storage container, wherein the frames and the containers are in mutual vertical alignments.
Figure 8:
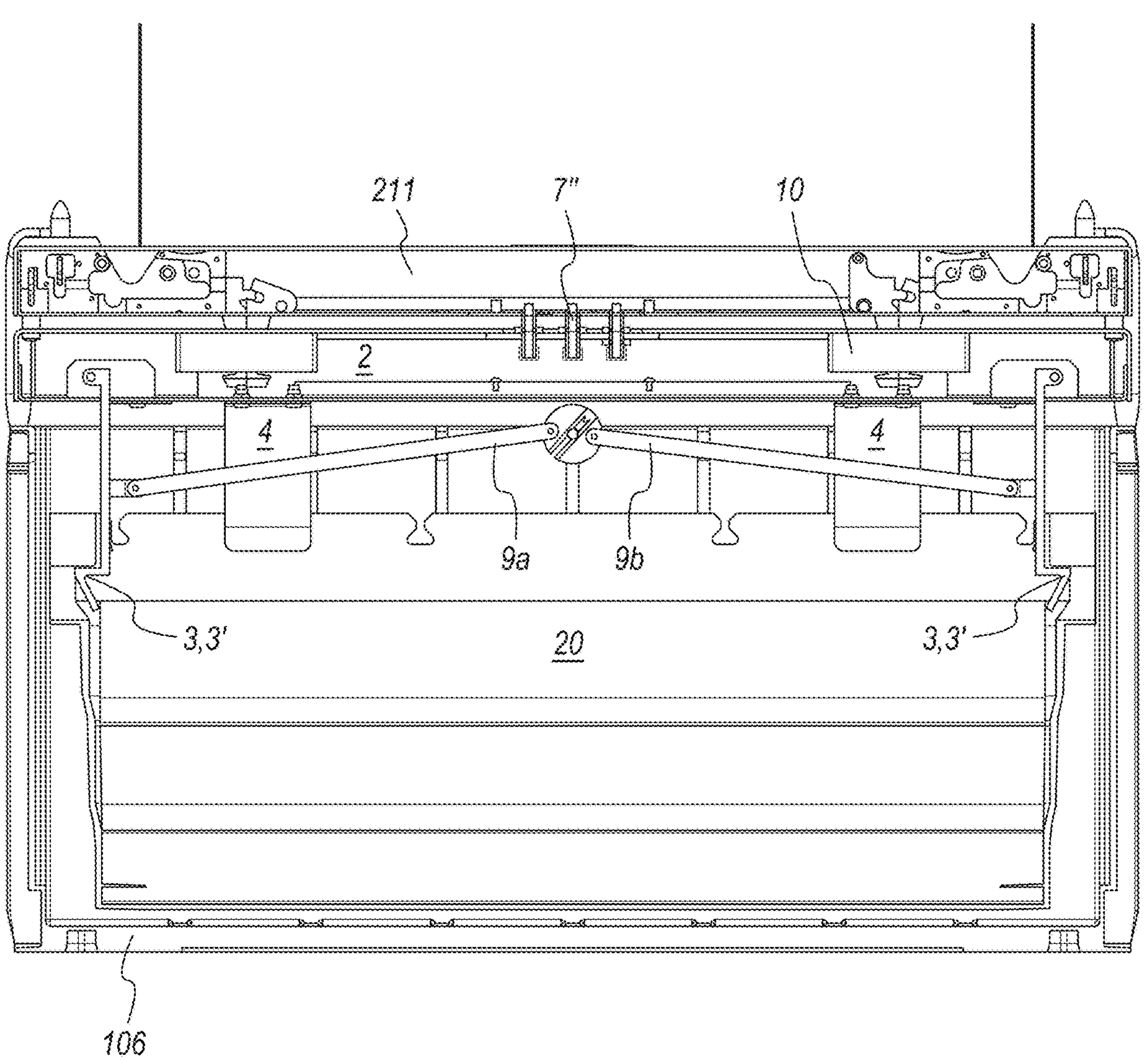
FIG. 8 is a cross sectional view of a lifting device assembly in accordance with an embodiment of the invention of which the lifting device has been releasably connected to the coupler and wherein the coupler is releasably connected to the delivery container.
Figure 9:
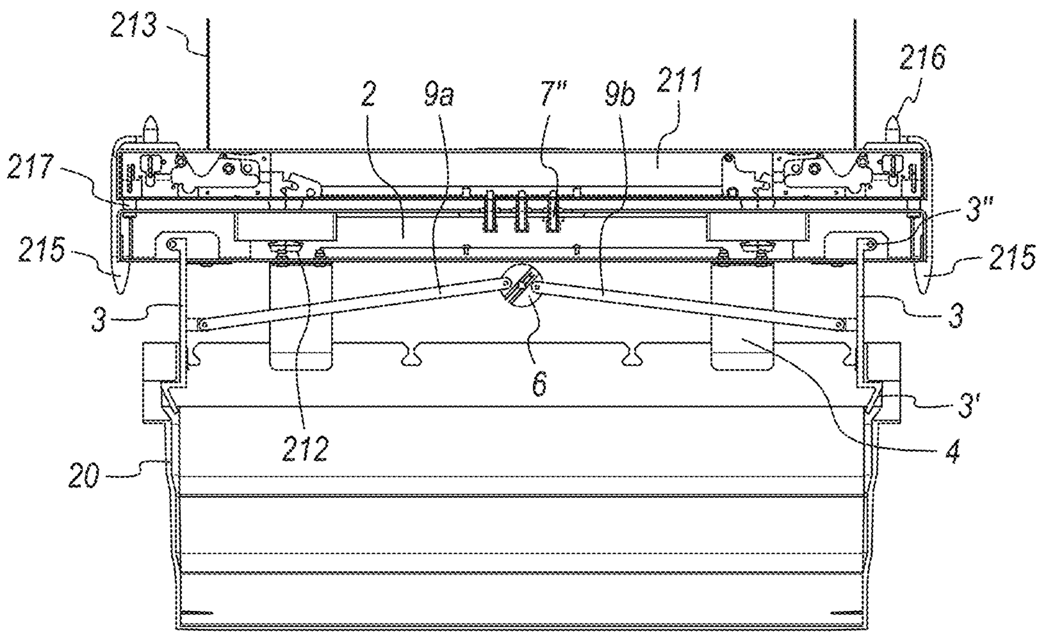
FIG. 9 are cross sectional view of a lifting device assembly in accordance with an embodiment of the invention which is connected to the delivery container and raised such that the delivery container is above the storage container.
Figure 9:
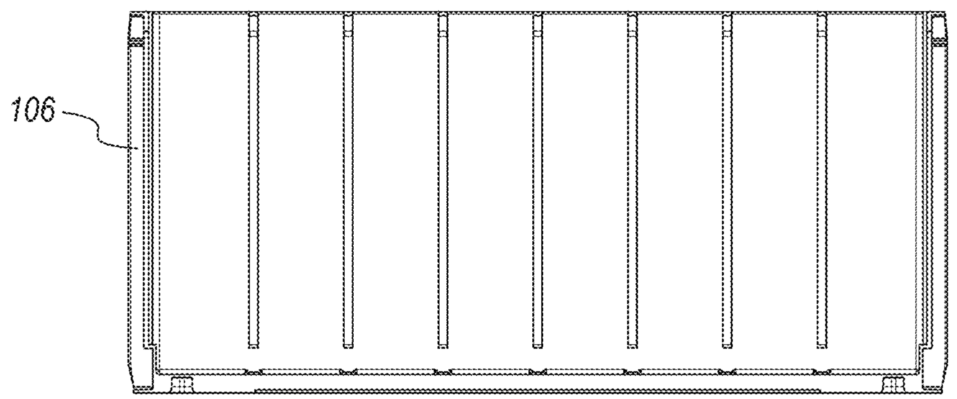
Figure 10:
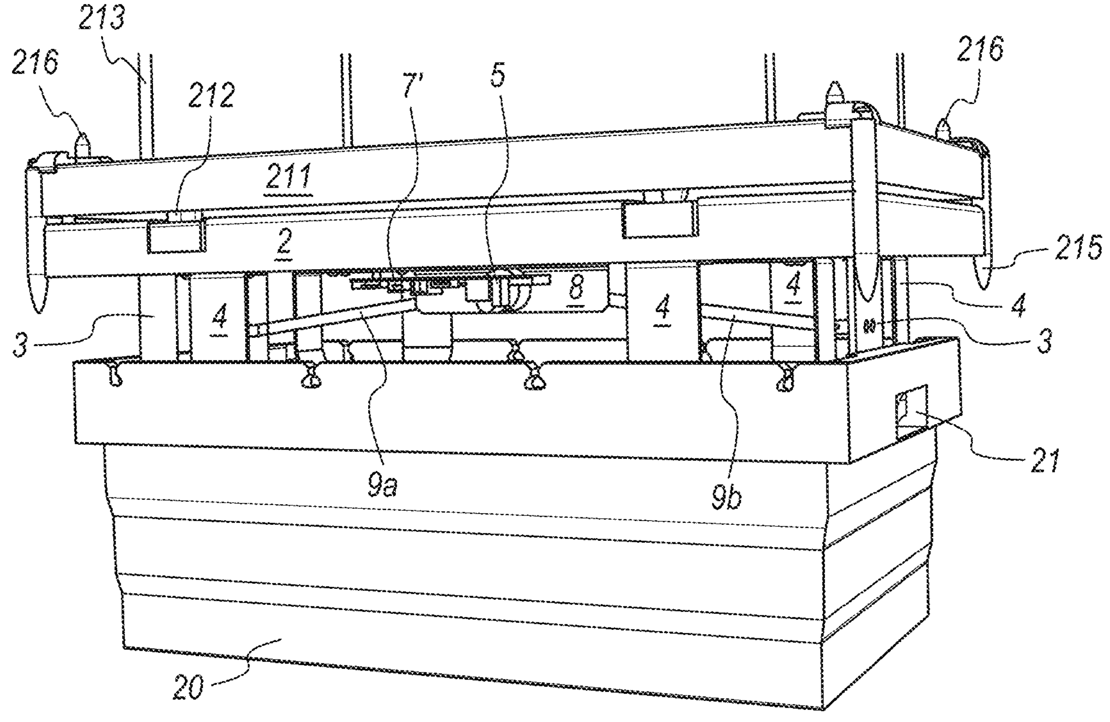
FIG. 10 is a perspective side view of a lifting device assembly in accordance with an embodiment of the invention, wherein the coupler is connected to the delivery container.

With further reference to FIGS. 7-9, the coupler 1 comprises a coupler frame 2 with a lower face 2' and an upper face 2", a delivery container coupling mechanism 3 for releasable connection to gripping structures/formations 21 on the inner wall or rim of the tote 20, a rotary disc 6 rotationally connected to a motor 5 and links/arms 9,9*a*,9*b* connecting the gripper paddles 3 with the rotary disc 6.

In FIGS. 7-9, these gripping structures 21 are recesses/apertures located into the tote's inner wall, below the tote's opening rim 22.

The delivery container coupling mechanism 3 may include two container gripper paddles 3 (a first paddle 3*a* and a second paddle 3*b*), hereinafter called tote paddles, where each tote paddle 3*a*, 3*b* has a protrusion 3' at the lower end such as a ledge, rib or fold, and where the upper end 3" of the paddles 3 is attached pivotally and/or resiliently to the coupler frame 2. Moreover, the length and design of each tote paddle 3 is arranged such that the protrusions 3' are vertically aligned (same height) with the recesses/apertures 21 within inner walls of the tote 20 when the coupler frame 2 is abutting an opening frame/upper rim 22 of the tote 20.

An actuator system 5-9, which also forms part of the coupler 1, is arranged with the coupler frame 2 and/or below the lower face 2'. The actuator system 5-9 is configured such that it may displace the first and second tote paddles 3*a*,3*b* in opposite directions by remote operation.

In the particular embodiment shown in FIGS. 6-9, the actuator system 5-9 includes a motor 5, a control system 7 allowing control of the operation of the motor 5 and signal communication with a control system 600, a rotary disc 6 connected to the motor 5 and two links/displacement arms 9*a*,9*b* connecting the rotary disc 6 to each of the tote paddles 3*a*, 3*b*.

The motor 5, the rotary disc 6 and the control system 7 are fixed to the coupler frame 2*a* by a motor support 8 in the form of an angle bracket. The motor 5 may for example be a DC motor.

The two links/displacement arms 9*a*,9*b* are in FIGS. 6-9 configured and sized in the following way:

A first end of the first link 9*a* and a first end of the second link 9*b* are pivotably connected to the rotary disc 6 at opposite sides of the disc's 6 rotational axis, while a second end of the first link 9*a* and a second end of the second link 9*b* are pivotably connected to the first tote paddle 3*a* and the second tote paddle 3*b*.

The particular configuration with opposite positioned first ends of the links 9*a,b* on the rotary disc 6 result in an equal length and opposite directed displacement of the links 9*a*, 9*b*, and hence an equal pivoting of the tote gripper paddles 3*a*,3*b*.

By adjusting the position, angle and length of the tote paddles 3 such that the protrusions 3' are aligned at the same vertical level (same height) as the recesses/apertures 21 of the tote 20, and ensuring a rotation of the rotary disc 6 by the motor 5 which causes a horizontal deflections of the tote paddles 3, the actuator system 5-9 allows switching between a lock position where the protrusions 3' are inside the respective recesses/apertures 21 and a release position where the protrusions 3' are removed from the respective recesses/apertures 21.

The degree of rotation of the rotary disc 6 by the motor 5 should be sufficient to ensure insertion of the protrusions 3' into the recesses/apertures 12. The rotation is preferably within a range of 70-100°, for example 90°.

The motor 5 may be operated remotely via a coupler control system 7 arranged on or within the coupler frame 2. The coupler system 7 includes a lifting device connector 7" in the form of electrical pins for transmitting electrical power and any control signals from the lifting device 210 when in a coupled position beneath the lifting device 210 and gripped by the grippers 212. Said electrical power and signals transmitted via the lifting device 210 enable drive and regulations of the motor 5, which again operates the gripper paddles to connect to the gripping structures 21 of the tote 20 via the rotary disc 6 and links 9. The coupler control system 7 may also include a separate transmission system 7' configured for wireless transmission of signals to/from one or more remote control systems 600.

In FIGS. 7-9, the grippers 212 in the form of claws are shown connected to the coupler frame 2 via recesses 10 arranged in horizontal alignment with the claws on the upper face 2". The gripping operation of the claws 212 is achieved by a gripper operating mechanism 212' arranged within the lifting frame 211.

In FIG. 7, the coupled assembly 1,210 of the lifting device 210 and the coupler 1 is placed on top of an opening frame of the bin 106. The guiding pins 215 of the lifting device 210 protruding from the corners of the lifting frame 211 contribute to guide the assembly in alignment with the bin 106.

In addition, the lifting device 210 may include one or more vehicle sensors 216 and one or more coupler sensors 217 protruding from the corners of the upper face 211" and the corners of the lower face 211', respectively. The vehicle sensors 216 may register proximity and/or contact with the vehicle 200,300,350 onto which the lifting device 210 is connected. Likewise, the coupler sensors 217 may register proximity and/or contact with the coupler frame 2. Both types of sensors 216,217 may include a transmitter allowing transmittal of sensed signals to a remote control system 600. Furthermore, the coupler sensor(s) 217/vehicle sensor(s) 216 may be in form of a capacitive sensor (mutual capacitance and/or self-capacitance) for registering direct contact or proximity with the coupler frame 211 or vehicle/crane 200,300,350.

The coupler 1 may also include additional tote guiding plates 4 protruding from the lower face 2' to ensure correct alignment with the opening frame of the tote 20. The lower ends of the tote guiding plates 4 should hence be arranged such as they correspond to the size of the opening frame 22 of the tote 20. The guiding plates 4 may be resiliently connected to the coupler frame 2.

In the particular case where the tote 20 should be picked up from, or inserted into, a storage container 106, hereinafter called a bin, being higher and slightly wider than the tote 20, the coupler frame 2 may advantageously be slanted inwards in a direction from the upper face 2" to the lower face 2' in order to avoid undesired jamming between the coupler frame 2 and the opening frame of the bin 106.

One particular example of operation using a coupler 1 in a storage and retrieval system 100 as described above and shown in FIGS. 1-10 is a consolidation method for consolidating totes 20 in bins 106, where the totes 20 contains items/products to be delivered to end-customers.

Such an operation may contain the following steps:

1. A container handling vehicle 200,300,350 is instructed by a control system 600 to pick up an available coupler 1 arranged within reach of the vehicle 200,300,350 on, at or above the rail system 108.
2. When the coupler 1 is successfully coupled underneath the lifting device 210 of the vehicle 200,300,350, the vehicle 200,300,350 is instructed to move to a position on the rail system 108 where the lifting device assembly 1,210 (including the lifting device 210 and the coupler 1) is aligned directly above a storage column 105 into which a bin 106 containing a target tote 20 is arranged on top of a stack 107.
3. The vehicle 200,300,350 lowers the assembly 1,210 to the tote-in-bin arrangement 20,106 until the protrusions 3' of the tote paddles 3 are in alignment with the respective gripping structure 12 of the tote 20. The assembly 1,210 is preferably designed such that this alignment is achieved when the lowermost part of the assembly 1,120 is abutting the perimeters/opening frame of the bin 106.
4. The coupler control system 7 instructs the motor 5 to rotate the rotary element 6, and thereby to move the links 9*a*, 9*b* outwards in opposite directions such that the protrusions 3' couple with the gripping structure 12 (see FIG. 8). The commands may be sent from transmitters within the vehicle 200,300,350 via electrical connectors between the lifting device 210 and the coupler 1 (see e.g. FIG. 7) or directly from the control system 600 to receivers on the coupler control system 7. Such receivers may form an integral part of the motor 5.
5. The vehicle 200,300,350 lifts the assembly 1,210 with the tote 20 such that the bottom of the tote 20 is positioned a distance above the rail system 108.
6. The vehicle 200,300,350 moves to a position in which the assembly 1,210 with the target tote 20 is directly above a storage column 105 within a consolidation area of the rail system 108. having an empty bin 106 at the top of the stack 107.
7. Placing the target tote 20 within the empty bin 106 by lowering the assembly 1,210 such that the target tote 20 is at least partly, preferably fully, within the bin 106 and disconnecting the protrusions 3' from the gripping structure 21 by rotating the rotary element 6 in opposite direction as in point 4.
8. When one or more of the products stored within the target tote 20 is to be retrieved from the storage and retrieval system 100, a vehicle 200,300,350 is moved to the storage column 105 in point 7 and the target tote 20 is picked up from the bin 106 using the same procedure as in points 1-5 (or as in points 2-5 if the vehicle 200,300,350 in question already has a coupler 1 coupled to the lifting device 210).
9. The vehicle 200,300,350 is moved to a position in which the assembly 1,210 with the target tote 20 is positioned directly above a dedicated drop-off port column 119 (see FIG. 1) and the target tote 20 is lowered through the port column 119 to an access and distribution station 500 arranged at the port column's lower end.
10. The target tote 20 is picked up by a human operator and/or a robotic picking device 400 and placed on a suitable transport mechanism such as a conveyor system 503 for further transport to end customers.

11. An empty tote 20 is transported by the transport mechanism of point 10 to a position within reach of the human operator and/or the robotic picking device 400.
12. Via a pick-up port column 120, the empty tote 20 is raised to a position a distance above the rail system 108 by use of a vehicle 200,300,350 and placed in a storage column 105 by performing any of points 1-9 in opposite directions. The target tote 20 may be transported directly from the storage column 105 in point 2 to the drop-off port column 119 (hence omitting steps 6-8).

Further, only one port column 119 or 120 may be used throughout the operation steps 1-12.

Other mechanisms to transport the target totes 20 from the vehicle 200,300,350 to the access and distribution station 500 may be envisaged including separate bin transport devices such as vertical bin lifts and/or slanted conveyor belts.

In an alternative consolidation method in accordance with the invention, a robotic picking device 400 is arranged at or above the level of the rail system 108, thereby allowing the consolidations of totes 20 in bins 106 to be performed at least partly by the robotic picking device 400. Such an alternative configuration may also allow direct transfer of products between totes 20 and/or bins 106.

In another alternative consolidation method in accordance with the invention, the vehicle 200,300,350 does not pick up a coupler prior to performing steps 8 and 9, but instead picks up the bin 106 containing the target tote 20 using the vehicle's lifting device 210 and delivers this tote-in-bin arrangement 20,106 to the drop-off port column 119 for further transport to the access and distribution station 500.

Figure 11:
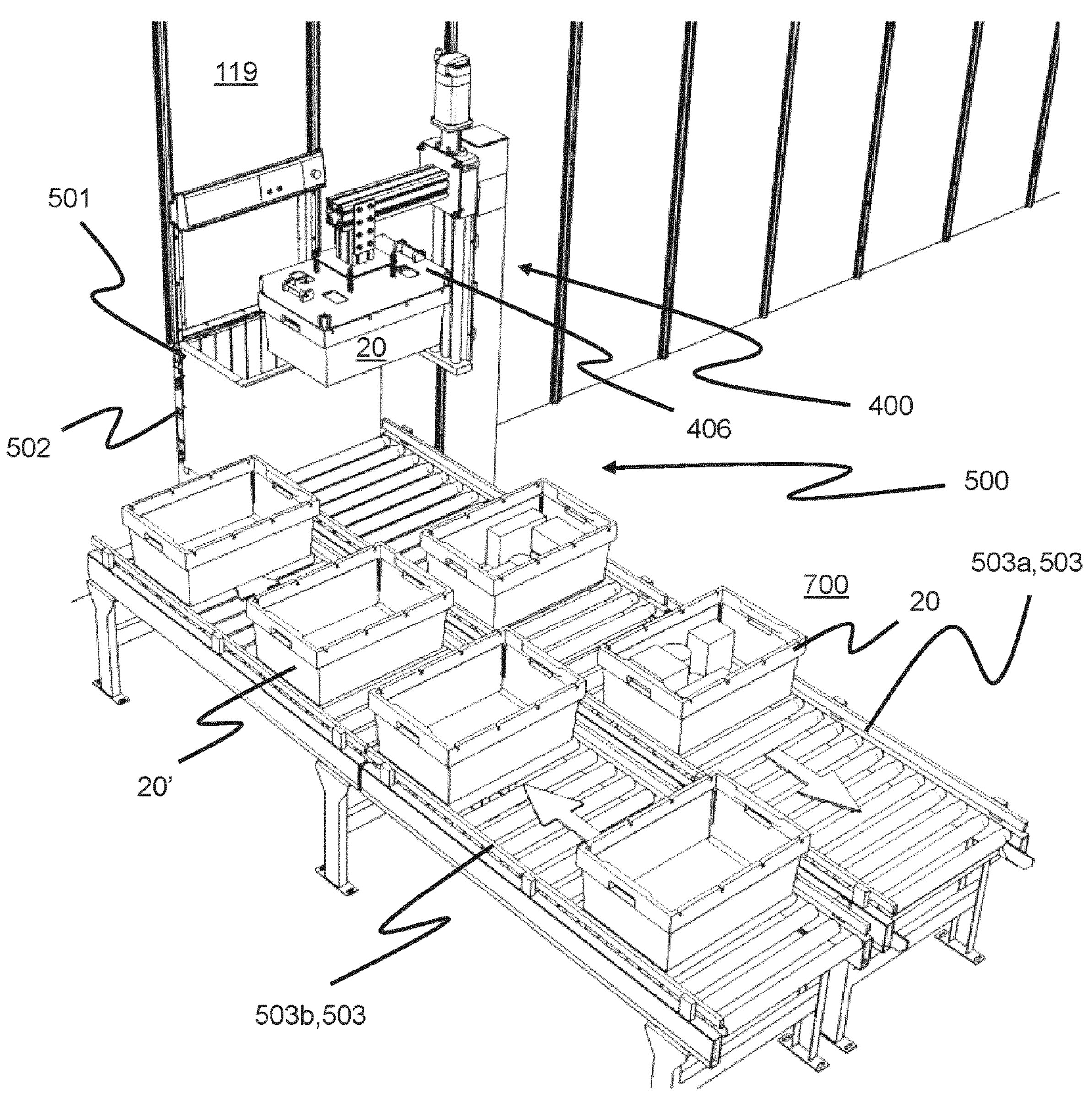
FIG. 11 is a perspective view of part of a storage and retrieval system in accordance with another embodiment of the invention including a first type of robotic picking device for picking delivery containers within storage containers.
Figure 12:
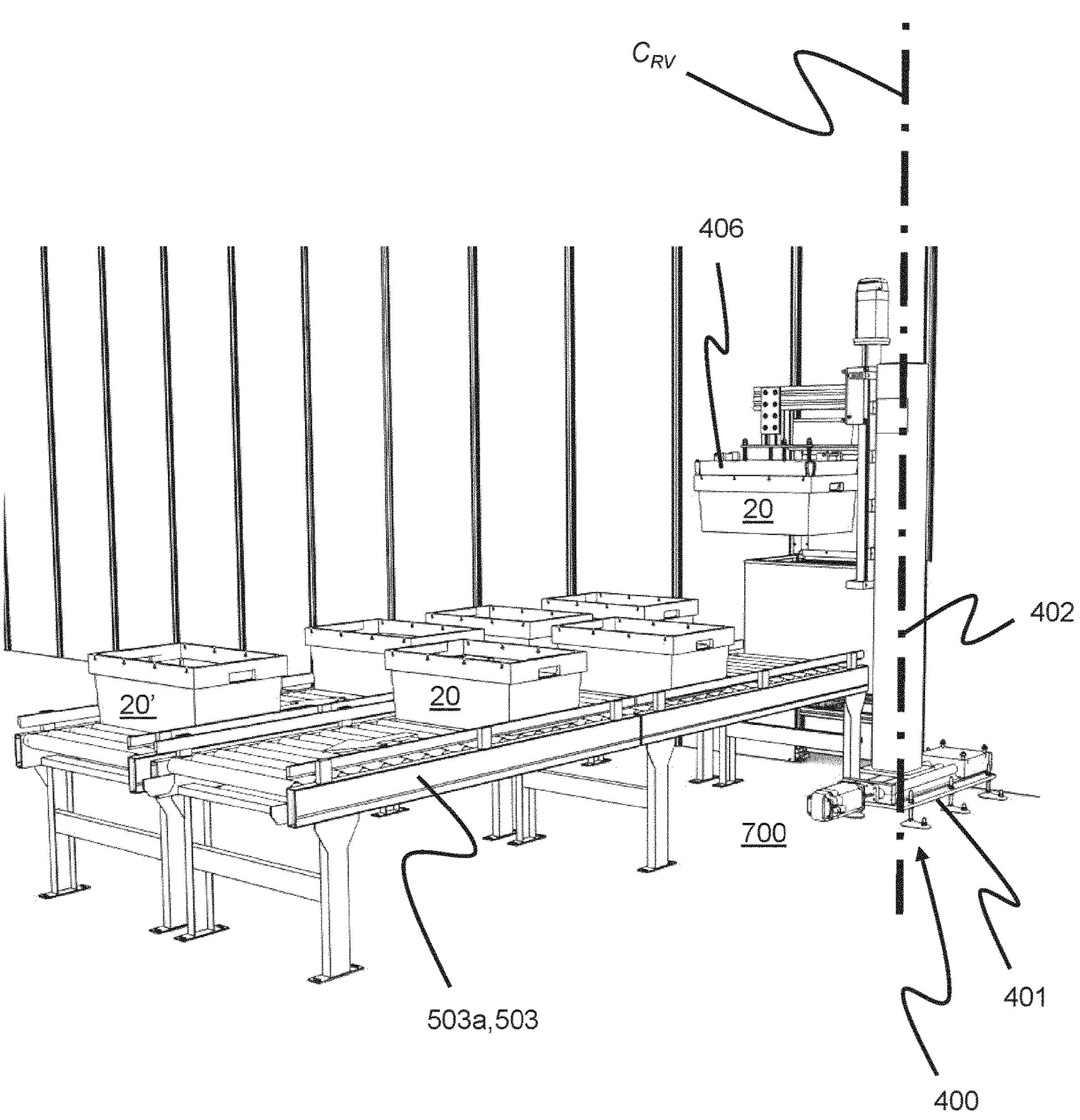
FIG. 12 is another perspective view of the part of the storage and retrieval system shown in FIG. 11.
Figure 13:
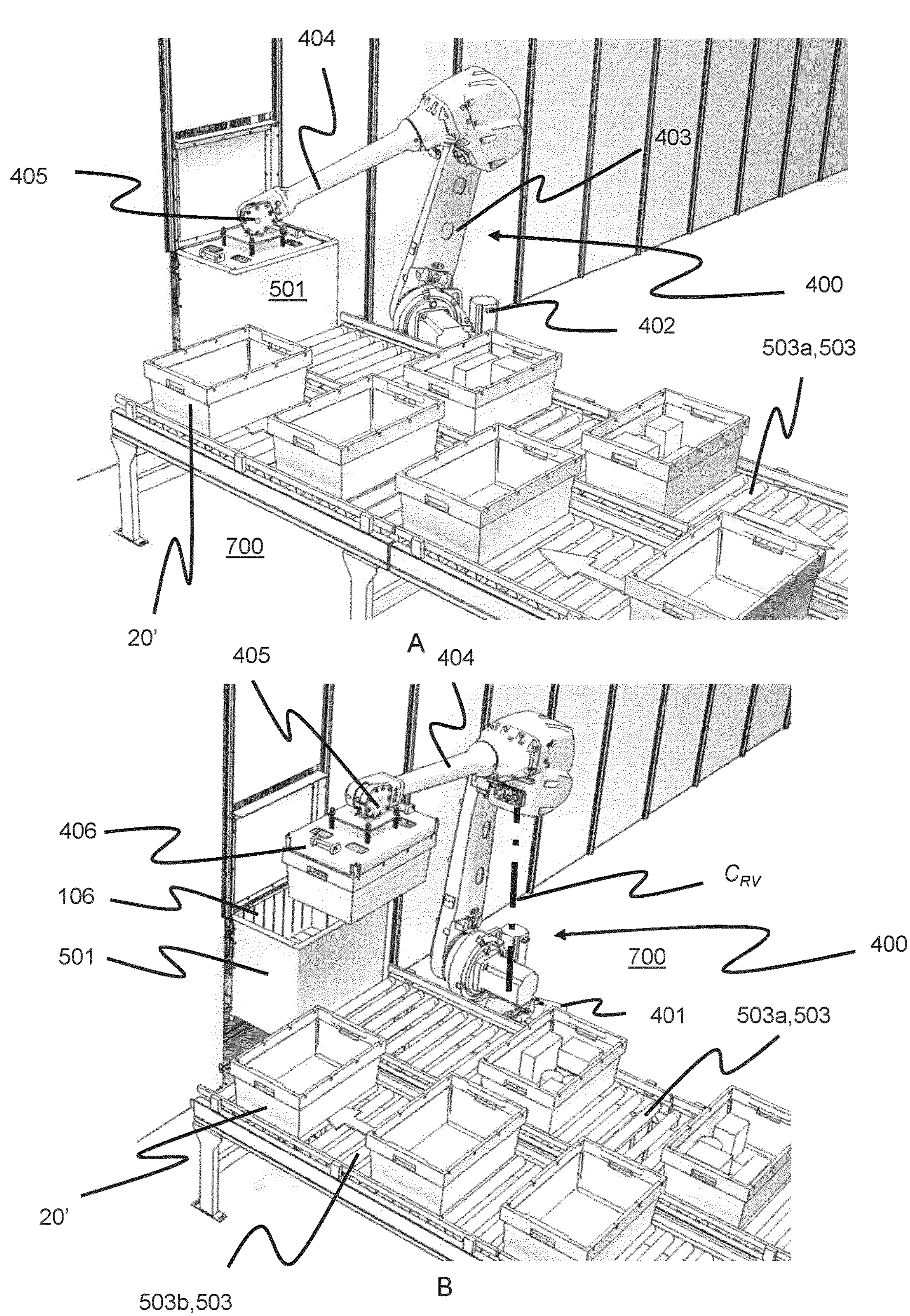
FIG. 13 is a perspective view of part of a storage and retrieval system in accordance with a further embodiment of the invention including a second type of robotic picking device for picking delivery containers within storage containers.

FIGS. 11-13 show two different embodiments of a product handling system 400,500 arranged adjacent a drop-off port column 119 of an automated storage and retrieval system 100. The product handling system 400,500 includes a robotic picking device 400 and an access and distribution station 500.

The robotic picking device 400 comprises a robotic base 401, two or more robotic segments 402-404 and an operative end 405 configured to grab and release a tote 20, for example by use of a second coupler 406 similar to the coupler 1 described above.

In the first embodiment shown in FIGS. 11 and 12, the access and distribution station 500 includes a container basket 501 configured to temporarily store/hold a bin 106 and a storage system access opening 502 through which the container basket 501 may be guided, for example by use of a dedicated container basket displacement mechanism (not shown). The container basket 501 may also be configured to allow temporarily storing totes 20 only. A configuration where the container basket 501 may either store bins 106 or smaller totes 20 may also be envisaged.

The station 500 of FIGS. 11 and 12 further includes a conveyor system 503 located at least partly outside the framework 101 of the storage and retrieval system 100. The conveyor system 503 may comprise a first conveyor belt 503*a* and a second conveyor belt 503*b* arranged parallel to each other. As illustrated in FIG. 11, by placing an end of each of the conveyor belts 503*a,b* next to the access opening 502, simultaneous transport of totes 20 to and from the container basket 501 is made possible, thereby increasing the overall efficiency of the product handling system 400, 500.

With particular reference to FIG. 12, the robotic picking device 400 comprises in this first embodiment a robotic base 401 fixed on a platform/floor 700, a first robotic segment 402 connected with a vertical orientation to the robotic base 401 such that controlled displacement parallel to the platform/floor 700 in direction to/from the storage system 100, a second robotic segment 403 connected with a horizontal orientation to the first robotic segment 402 such that controlled vertical displacement is enabled and an operative end 405 connected at least indirectly to the second robotic segment 403.

The above mentioned second coupler 406 on the operative end 405 includes a handle 15 arranged on top of its coupler frame 2.

The orientations vertical/horizontal is hereinafter measured relative to the platform/floor 700 of the robotic base 401. Note also that the conveyor system 503 and/or the framework 101 of the storage volume of the storage and retrieval system 100 may be supported on the same platform/floor 700 or alternatively to other platforms arranged at different vertical levels.

The controlled horizontal and vertical displacements may be achieved by known displacement devices such as motorized linear actuators and/or hydraulic cylinders. The connecting end of the second robotic segment 403 may for example be guided along vertical rods forming part of the first robotic segment 402.

The robotic picking device 400 is further arranged such that the operative end 405 may be maneuvered to a position centered above the container basket 501.

With the particular setup described above, and with the second coupler 406 connected to the operative end 405 of the robotic picking device 400, any tote 20 stored within respective bin 106, which again may be stored within the container basket 501, may be picked up via remote operation of the second coupler 406 and at least one of the first and second robotic segments 402,403 when the container basket 501 has been placed in a pick-up position outside the access opening 502.

Note that the bins 106 designed to contain the totes 20 may stay within the container basket 501 at any time during operation. Alternatively, the container basket 501 may be designed to temporarily store target totes 20 as mentioned above.

FIG. 13 shows a second embodiment a product handling system 400,500 using the above-mentioned second coupler 406. The second embodiment is near identical to the first embodiment in structure and operation except the use of another type of robotic picking device 400, namely a multi-joint type robotic picking device.

The multi-joint robotic picking device 400 comprises a robotic base 401 connected to a fixed platform/floor 700, a first robotic segment 402 rotatable connected to the robotic base 401, preferably with a vertical rotational axis $C_{RB}$ oriented perpendicular to the platform/floor 700, a second robotic segment 403 rotatably connected to the first robotic segment 402, preferably with a horizontal rotational axis oriented parallel to the platform/floor 700, a third robotic segment 404 rotatably connected to the second robotic segment 403, an operative end 405 forming part of, or being rotationally coupled to, the third robotic segment 403 and the second coupler 406 as described above connected, preferably removably, to the operative end 405.

All of the joints, i.e. the rotatable connection points described above, are equipped with remotely and/or autonomously operated rotary mechanisms, thereby allowing the multi-joint robotic picking device 400 to pick up a tote 20 with product items from within a bin 106 arranged inside a container basket 501, or directly from the container basket

501, and place the tote 20 onto the conveyor belt 503*a* transporting the tote 20 away from the framework 101. Likewise, the multi-joint configuration allows the robotic picking device 400 to pick an empty tote 20 from the conveyor belt 503*b* transporting the tote 20 towards the framework 101 and place the empty tote 20 into the bin 106 arranged inside the container basket 501, or directly into the container basket 501.

In the preceding description, various aspects of a coupler for releasable coupling to a container, a lifting device assembly including such a coupler, a product handling system for handling totes, an automated storage and retrieval system and associated methods have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the system, which are apparent to persons skilled in the art to which the disclosed subject matter pertains, are deemed to lie within the scope of the present invention.

| Reference numerals: | |
|---|---|
| 1 | Delivery container coupler/Coupler |
| 2 | Coupler frame |
| 2' | Coupler frame lower face |
| 2" | Coupler frame upper face |
| 3 | Delivery container coupling mechanism/ gripper paddle/tote paddle |
| 3' | Protrusion |
| 3" | Upper end of gripper element 3 |
| 4 | Delivery container guiding plate/Tote guiding plate |
| 5 | Motor (for displacing gripper elements 3) |
| 6 | Rotary element/rotary disc (rotationally connected to motor 5) |
| 7 | Coupler control system |
| 7' | Lifting device connector/electrical pins |
| 8 | Motor support/angle bracket |
| 9 | Gripper element displacement means |
| 9a | First displacement link |
| 9b | Second displacement link |
| 10 | Gripper receiving recess or throughgoing hole |
| 11 | Guiding pin receiving recess |
| 15 | Connection device |
| 20 | Delivery container/tote |
| 20' | Incoming delivery container/incoming tote |
| 21 | Gripping structure/recess/aperture within delivery container |
| 22 | Opening frame/upper rim |
| 100 | Storage and retrieval system |
| 101 | Framework/storage grid |
| 102 | Upright members of framework structure |
| 105 | Storage column |
| 106 | Storage container |
| 106' | Particular position of a storage container/ target storage container |
| 107 | Stack |
| 108 | Rail system |
| 110 | Parallel rails in first direction (X) |
| 111 | Parallel rail in second direction (Y) |
| 112 | Grid cell |
| 115 | Grid opening |
| 119 | First port column/drop-off port column |
| 120 | Second port column/pick-up port column |
| 200 | Container handling vehicle with cantilever |
| 201 | Vehicle body of the vehicle 200 |
| 202a | Drive means/wheel arrangement, first direction (X) |
| 202b | Drive means/wheel arrangement, second direction (Y) |
| 203 | Cantilever |
| 210 | Storage container lifting device/lifting device |
| 211 | Lifting frame |
| 211' | Lifting frame lower face |
| 211" | Lifting frame upper face |
| 212 | Gripper/claw/hook |
| 212' | Gripper operating mechanism/claw or hook operating mechanism |
| 213 | Lifting mechanism/lifting band |
| 213' | Attachment points/attachment elements/ attachment mounts |
| 215 | Guiding pin |
| 216 | Vehicle sensor |
| 217 | Coupler sensor |
| 300 | Container handling vehicle with central cavity, occupying a single cell |
| 301 | Vehicle body of the vehicle 300 |
| 302a | Drive means/wheel arrangement, first direction (X) |
| 302b | Drive means/wheel arrangement, second direction (Y) |
| 350 | Container handling vehicle with an internal cavity, occupying more than a single cell |
| 400 | Robotic picking device |
| 401 | Robotic base |
| 402 | First robotic segment |
| 403 | Second robotic segment |
| 404 | Third robotic segment |
| 405 | Operative end |
| 406 | Second coupler |
| 500 | Access and distribution station |
| 501 | Container support/container basket |
| 502 | Storage system access opening |
| 503 | Conveyor system |
| 503a | First conveyor belt |
| 503b | Second conveyor belt |
| 600 | Control system |
| 700 | Floor |
| X | First direction |
| Y | Second direction |
| Z | Third direction |
| $C_{RB}$ | Rotational robotic base axis |

The invention claimed is:

1. A lifting device assembly for handling a delivery container stored within a storage container, the lifting device assembly comprising:

a delivery container coupler comprising, a coupler frame having a coupler frame lower face and a coupler frame upper face, and a delivery container coupling mechanism fixed to the coupler frame and protruding from the coupler frame lower face for enabling releasable coupling to corresponding coupling structures within an inner volume of a delivery container, a lifting device comprising, a lifting frame having a lifting frame lower face and a lifting frame upper face, and a plurality of grippers connected to the lifting frame for releasable connection to the coupler, wherein the lifting frame is configured such that the lifting frame lower face can be arranged adjacent to the coupler frame upper face in a coupled position.

2. The lifting device assembly in accordance with claim 1, wherein the coupler frame further comprises:

a plurality of recesses and/or throughgoing holes, wherein the number of recesses and/or throughgoing holes is at least equal to the number of grippers, and wherein the position of each recess and/or throughgoing hole is such that, when the lifting frame lower face is arranged in the coupling position above the coupler frame upper face, each gripper is aligned with a corresponding recess and/or throughgoing hole.

3. The lifting device assembly in accordance with claim 1, wherein the lifting frame further comprises:

attachment mounts for attachment of lifting bands.

4. The lifting device assembly in accordance with claim 1, wherein the lifting device further comprises:

a sensor configured to sense when the lifting frame lower face is in contact with, and/or in proximity to, the coupler frame upper face.

5. The lifting device assembly in accordance with claim 1, wherein the plurality of grippers protrudes from the lifting frame lower face, and wherein the lifting device further comprises a gripper operating mechanism arranged at least partly within the lifting frame.

6. The lifting device assembly in accordance with claim 1, wherein the lifting device further comprises a plurality of guiding pins protruding from the lifting frame lower face for insertion into receiving recesses of a storage container, the storage container being arranged to hold the delivery container there within, and wherein the coupler frame further comprises a plurality of guiding pin receiving recesses and/or throughgoing holes extending between the coupler frame lower and upper faces, the position of each guiding pin receiving recess and/or throughgoing hole being such that, when the lifting frame lower face is arranged in the coupled position above the coupler frame upper face, each guiding pin passes through a corresponding guiding pin receiving recess and/or throughgoing hole.

7. The lifting device assembly in accordance with claim 1, wherein a cross sectional area of the lifting frame lower face is at least equal to a cross sectional area of the coupler frame upper face.

8. The lifting device assembly in accordance with claim 1, wherein the delivery container coupling mechanism comprises:

two gripper paddles for gripping the delivery container arranged at equal and oppositely directed distances from a vertical centre plane oriented perpendicular to the coupler frame lower face, wherein each of the gripper paddles comprises a protrusion located below the coupler frame lower face for insertion into a corresponding coupling structure of the delivery container.

9. The lifting device assembly in accordance with claim 8, wherein the delivery container coupling mechanism further comprises:

a displacement system for displacing the two gripper paddles in opposite directions from the vertical centre plane until the protrusions have engaged the respective coupling structure.

10. The lifting device assembly in accordance with claim 9, wherein the displacement system comprises:

a motor, a control system configured to control operation of the motor, a first link connected at one end to the motor and the other end to one of the two gripper paddles, and a second link connected at one end to the motor and the other end to the other of the two gripper paddles, wherein the motor is configured to displace the first and second links in opposite directions away from the vertical centre plane.

11. The lifting device assembly in accordance with claim 10, wherein the displacement system further comprises:

a rotary element connecting the first and second links to a shaft of the motor, wherein the motor, the rotary element and the links are configured such that the opposite directed displacement of the first and second links is achieved by rotating the rotary element clockwise or counterclockwise between 0 degrees and 180 degrees.

12. The lifting device assembly in accordance with claim 10, wherein the control system is divided into:

a lower part at the coupler frame lower face, and an upper part at the coupler frame upper face, wherein the upper part comprises:

one or more lifting device connectors in signal communication with the lower part, and wherein the lifting frame comprises one or more coupler connectors in signal communication with the one or more lifting device connectors.

13. A delivery container coupler for use in a lifting device assembly according to claim 1, wherein the coupler comprises;

wherein the coupler is configured to be gripped from the coupler frame upper face by the plurality of grippers of the lifting device, and wherein the coupler further comprises:

electrical contacts on its coupler frame upper face to receive electrical power from the lifting device when in a coupled position beneath the lifting device and gripped by the grippers of the lifting device, the electrical power being for operating the delivery container coupling mechanism for releasable coupling to an interior surface of a delivery container.

14. The delivery container coupler in accordance with claim 13, wherein the delivery container coupling mechanism comprises gripper paddles arranged to be pivoted outwardly into contact with coupling structures of the delivery container.

15. The delivery container coupler in accordance with claim 13, wherein the coupler is configured to extend no further in a transverse direction than a perimeter of the lifting device it is intended to be coupled with.

16. A storage and retrieval system comprising:

a framework comprising a plurality of vertical upright members defining a plurality of storage columns for storing stacks of storage containers, and a rail system arranged on the framework, the rail system comprising perpendicular rails, the intersections of which rails form a grid of grid cells, the rails defining grid openings into the plurality of storage columns, and a container handling vehicle comprising:

drive means configured to travel along the rail system, a lifting device assembly for handling a delivery container stored within a storage container, the lifting device assembly comprising:

a delivery container coupler comprising:

a coupler frame having a coupler frame lower face and a coupler frame upper face, and a delivery container coupling mechanism fixed to the coupler frame and protruding from the coupler frame lower face for enabling releasable coupling to corresponding coupling structures within an inner volume of a delivery container, a lifting device comprising:

a lifting frame having a lifting frame lower face and a lifting frame upper face, and a plurality of grippers connected to the lifting frame for releasable connection to the coupler, wherein the lifting frame is configured such that the lifting frame lower face can be arranged adjacent to the coupler frame upper face in a coupled position, a storage container space for receiving and stowing a storage container, a lifting motor for lifting the storage container into the storage container space and lifting bands connected at one end to attachment mounts and the other end to the lifting motor.

17. The storage and retrieval system in accordance with claim 16, wherein the storage and retrieval system further comprises:

a control system, and a robotic picking device in signal communication with the control system, the robotic picking device comprising a robotic base, a first robotic segment rotatably connected to the robotic base and an operative end configured to allow releasable connection to the delivery container, wherein the robotic picking device is configured such that the operative end may be moved to a position at least within reach of the storage container to be delivered to an access and distribution station.

18. A method for lifting a delivery container arranged within a storage container using a container handling vehicle and a delivery container coupler, wherein the vehicle comprises a storage container space for receiving and stowing a storage container, drive means configured to move the vehicle along a rail system, a lifting device for lifting and lowering the storage container, a lifting motor for lifting the storage container into the storage container space and lifting bands connected at one end to the lifting device and the other end to the lifting motor, wherein the lifting device comprises a lifting frame and a plurality of grippers protruding from the lifting frame lower face, and wherein the coupler comprises a coupler frame and a delivery container coupling mechanism fixed to the coupler frame for enabling releasable coupling to corresponding coupling structures within an inner volume of a delivery container or at a contour of the delivery container, wherein the method comprises:

lowering the lifting device into contact or proximity with a coupler frame of the coupler, gripping the coupler by operating the grippers to form a lifting device assembly, raising the lifting device with the coupler connected thereto, moving the container handling vehicle along the rail system to a position in which the lifting device assembly is above a storage container containing a delivery container, lowering the lifting device assembly to a position in which the coupler may connect with the delivery container, connecting the coupler to the delivery container by operating the delivery container coupling mechanism, and raising the delivery container from within the storage container by use of the lifting motor until the delivery container is at least partly within the storage container space.

19. The method in accordance with claim 18, wherein the storage container is stored within a storage and retrieval system comprising:

the container handling vehicle, a framework comprising a plurality of vertical upright members defining a plurality of storage columns for storing stacks of storage containers, and the rail system arranged on the framework, the rail system comprising perpendicular rails, the intersections of which rails form a grid of grid cells, the rails defining grid openings into the plurality of storage columns, wherein the step of moving the container handling vehicle to a position in which the lifting device assembly is above a storage container containing a delivery container is restricted to the orientation of the rails.

20. The method in accordance with claim 19, wherein the storage and retrieval system further comprises:

a port column, and an access and distribution station arranged at a lower end of the port column, wherein the method further comprises:

moving the container handling vehicle to a position where the delivery container is above the port column, and transporting the delivery container to the access and distribution station.

21. The method in accordance with claim 20, wherein the method further comprises:

re-connecting the container handling vehicle to the coupler, moving the container handling vehicle to a position such that the coupler is above one of the at least one port column, lowering the coupler into the port column until the coupler is in a gripping position with a delivery container arranged at a lower end of the port column, connecting the delivery container to the coupler, and raising the delivery container at least partly into the storage container space of the container handling vehicle.

22. A computer-readable medium having stored thereon a computer program comprising instructions to execute a method for lifting a delivery container arranged within a storage container using a container handling vehicle and a delivery container coupler, wherein the vehicle comprises a storage container space for receiving and stowing a storage container, drive means configured to move the vehicle along a rail system, a lifting device for lifting and lowering the storage container, a lifting motor the storage container space and lifting bands connected at one end to the lifting device and the other end to the lifting motor, wherein the lifting device comprises a lifting frame and a plurality of grippers protruding from the lifting frame lower face, and wherein the coupler comprises a coupler frame and a delivery container coupling mechanism fixed to the coupler frame for enabling releasable coupling to corresponding coupling structures within an inner volume of a delivery container or at a contour of the delivery container, wherein the method comprises:

lowering the lifting device into contact or proximity with a coupler frame of the coupler, gripping the coupler by operating the grippers to form a lifting device assembly, raising the lifting device with the coupler connected thereto, moving the container handling vehicle along the rail system to a position in which the lifting device assembly is above a storage container containing a delivery container, lowering the lifting device assembly to a position in which the coupler may connect with the delivery container, connecting the coupler to the delivery container by operating the delivery container coupling mechanism, and raising the delivery container from within the storage container by use of the lifting motor until the delivery container is at least partly within the storage container space.

* * * * *